United States Patent
Zhang et al.

(10) Patent No.: US 12,081,463 B2
(45) Date of Patent: Sep. 3, 2024

(54) WIRELESS NETWORK COMMUNICATION METHOD AND TERMINAL DEVICE

(71) Applicant: Huawei Technologies Co., Ltd., Shenzhen (CN)

(72) Inventors: Lili Zhang, Beijing (CN); Meng Deng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 389 days.

(21) Appl. No.: 17/363,374

(22) Filed: Jun. 30, 2021

(65) Prior Publication Data

US 2021/0328733 A1 Oct. 21, 2021

Related U.S. Application Data

(63) Continuation of application No. PCT/CN2019/130050, filed on Dec. 30, 2019.

(30) Foreign Application Priority Data

Dec. 31, 2018 (CN) .......................... 201811650647.3

(51) Int. Cl.
*H04L 5/00* (2006.01)
*H04W 72/51* (2023.01)

(52) U.S. Cl.
CPC ............ *H04L 5/001* (2013.01); *H04L 5/0037* (2013.01); *H04W 72/51* (2023.01)

(58) Field of Classification Search
CPC ..... H04L 5/001; H04L 5/0037; H04L 5/0078; H04L 5/0092; H04L 5/1469; H04W 72/51; H04W 72/0446; H04W 72/53
See application file for complete search history.

(56) References Cited

U.S. PATENT DOCUMENTS

| | | |
|---|---|---|
| 2014/0029459 A1 | 1/2014 | Kwon et al. |
| 2018/0309513 A1 | 10/2018 | Kim et al. |

(Continued)

FOREIGN PATENT DOCUMENTS

| | | |
|---|---|---|
| CN | 102231643 A | 11/2011 |
| CN | 102523627 A | 6/2012 |

(Continued)

OTHER PUBLICATIONS

Nokia et al., "Comments on the UE behaviours regarding slot configuration in TS38.213", 3GPP TSG RAN WG1 Meeting AH1801, R1-1800737, Vancouver, Canada, Jan. 22-26, 2018, 10 pages.

(Continued)

*Primary Examiner* — Marisol Figueroa
(74) *Attorney, Agent, or Firm* — Slater Matsil, LLP

(57) ABSTRACT

Embodiments of this application provide a wireless network communication method and a terminal device. The method includes: receiving, by a terminal device, information indicating a transmission direction type of a first time unit of a first component carrier and information indicating a transmission direction type of a corresponding second time unit of at least one second component carrier; and when the transmission direction type of the first time unit of the first component carrier of the terminal device is a flexible or variable transmission direction, determining, based on target information, sending and receiving manners of the terminal device in the corresponding second time unit of the at least one second component carrier.

18 Claims, 6 Drawing Sheets

(56) References Cited

U.S. PATENT DOCUMENTS

2018/0367289 A1  12/2018  Kim et al.
2020/0169377 A1* 5/2020  Lee .................. H04W 56/0015

FOREIGN PATENT DOCUMENTS

| CN | 102624507 A | 8/2012 |
|---|---|---|
| CN | 102986286 A | 3/2013 |
| CN | 104380626 A | 2/2015 |
| CN | 107257274 A | 10/2017 |
| CN | 109088713 A | 12/2018 |
| JP | 2017092508 A | 5/2017 |
| WO | 2018231678 A1 | 12/2018 |

OTHER PUBLICATIONS

NTT Docomo, Inc., "Maintenance for DL/UL data scheduling and HARQ procedure", 3GPP TSG RAN WG1 Meeting #94, R1-1809143, Gothenburg, Sweden, Aug. 20-24, 2018, 11 pages.

3GPP TS 38.211 V15.3.0 (Sep. 2018), 3rd Generation Partnership Project; Technical Specification Group Radio Access Network; NR; Physical channels and modulation (Release 15), 96 pages.

3GPP TS 38.213 V15.3.0 (Sep. 2018), 3rd Generation Partnership Project; Technical Specification Group Radio Access Network; NR; Physical layer procedures for control (Release 15), 101 pages.

Qualcomm Inc., "Summary of GC-PDCCH carrying SFI", 3GPP TSG RAN WG1 #95, R1-1814030, Spokane, WA, USA, Nov. 12-16, 2018, 2 pages.

* cited by examiner

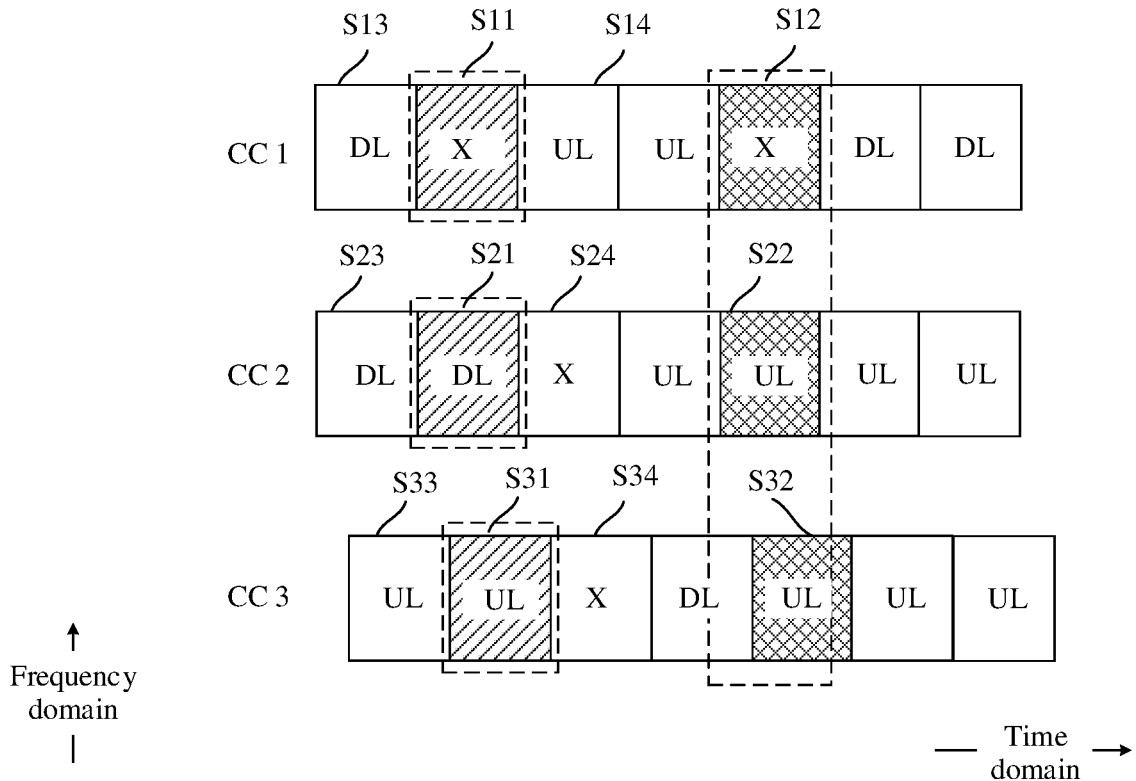

FIG. 2

S310: A terminal device receives information indicating a transmission direction type of a first time unit of a first component carrier and information indicating a transmission direction type of a corresponding second time unit of at least one second component carrier S320: When the transmission direction type of the first time unit of the first component carrier is a flexible and variable transmission direction, determine, based on target information, sending and receiving manners of the terminal device in the corresponding second time unit of the at least one second component carrier

FIG. 3

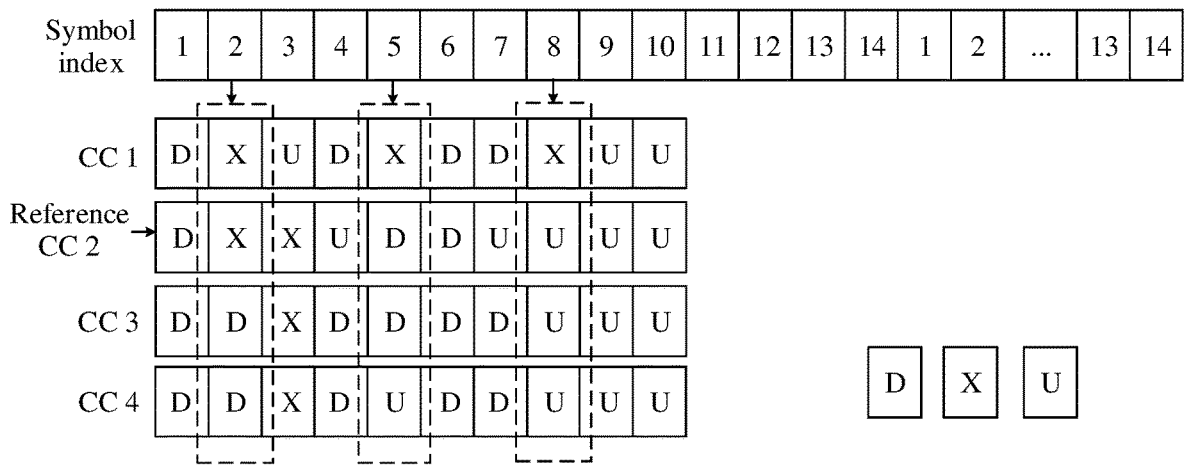

FIG. 7

S810: A terminal device receives information indicating a transmission direction type of a first time unit of a first component carrier and information indicating a transmission direction type of a corresponding second time unit of at least one second component carrier S820: When the first time unit of the first component carrier of the terminal device is semi-statically configured, determine, based on target information, sending and receiving manners of the terminal device in the corresponding second time unit of the at least one second component carrier

FIG. 8

WIRELESS NETWORK COMMUNICATION METHOD AND TERMINAL DEVICE

CROSS-REFERENCE TO RELATED APPLICATIONS

This application is a continuation of International Application No. PCT/CN2019/130050, filed on Dec. 30, 2019, which claims priority to Chinese Patent Application No. 201811650647.3, filed on Dec. 31, 2018. The disclosures of the aforementioned applications are hereby incorporated by reference in their entireties.

TECHNICAL FIELD

Embodiments of this application relate to the communications field, and more specifically, to a wireless network communication method and a terminal device.

BACKGROUND

With development of communications technologies, a network has an increasingly high requirement on uplink and downlink peak data rates. In carrier aggregation (CA), two or more component carriers (CC) may be aggregated to support a higher transmission bandwidth.

For a terminal device that cannot perform full-duplex communication, when carriers having different transmission direction configurations are aggregated together, if a transmission direction type of a time unit of a specific cell is a flexible or variable transmission direction, the terminal device neither receives nor transmits any signal or channel in the same time unit of another cell.

In the foregoing solution, when the transmission direction type of the time unit of the specific cell is the flexible or variable transmission direction, the same time unit of the another cell is idle, causing a waste of resources.

SUMMARY

Embodiments of this application provide a wireless network communication method and a terminal device, so that a terminal device having a carrier aggregation function can fully use system resources, thereby improving system efficiency.

According to a first aspect, a wireless network communication method is provided. The method includes: receiving, by a terminal device, information indicating a transmission direction type of a first time unit of a first component carrier and information indicating a transmission direction type of a corresponding second time unit of at least one second component carrier; and when the transmission direction type of the first time unit of the first component carrier of the terminal device is a flexible or variable transmission direction, determining, based on target information, sending and receiving manners of the terminal device in the corresponding second time unit of the at least one second component carrier, where the corresponding second time unit of the at least one second component carrier and the first time unit of the first component carrier overlap; and the target information includes at least one of the following information: a configuration manner of the first time unit of the first component carrier, a configuration manner of the corresponding second time unit of the at least one second component carrier, and the transmission direction type of the corresponding second time unit of the at least one second component carrier.

In the technical solution of this application, when the time unit of the first component carrier is a flexible time unit, a corresponding time unit of another component carrier is not directly set to be idle. Instead, the target information related to the component carrier, for example, the transmission direction type and the configuration manner of the time unit of the component carrier, is fully considered, to further determine whether the terminal device performs sending or receiving in the corresponding time unit of the another component carrier, so that the terminal device can fully use system resources, thereby improving system efficiency.

Specifically, when a transmission direction type of a time unit of a specific cell is a flexible or variable transmission direction, in the prior art, the terminal device sets the same time unit of another cell to be idle. In the technical solution of this application, based on information about a configuration manner and/or the transmission direction type of the time unit of a component carrier, sending and receiving manners of the terminal device in the same time unit of the another cell are determined, so that a problem that the terminal device performs neither sending nor receiving in the same time unit of the another cell is avoided, and the terminal device having a carrier aggregation function can fully use system resources, thereby improving system efficiency.

With reference to the first aspect, in a possible implementation, the time unit is at least one of a subframe, a slot, a mini-slot, or a symbol.

With reference to the first aspect, in a possible implementation, the determining, based on target information, sending and receiving manners of the terminal device in the corresponding second time unit of the at least one second component carrier includes: when the transmission direction type of the corresponding second time unit of the at least one second component carrier includes an uplink transmission direction and a downlink transmission direction, skipping, by the terminal device, performing sending and receiving in the corresponding second time unit of the at least one second component carrier.

When the transmission direction types of the corresponding time units of the second component carriers conflict, and the terminal device cannot simultaneously perform sending and receiving, the terminal device sets the corresponding time units of all the second component carriers to be idle, and performs neither receiving nor sending. In this way, a working fault of the terminal device can be reduced.

With reference to the first aspect, in a possible implementation, the determining, based on target information, sending and receiving manners of the terminal device in the corresponding second time unit of the at least one second component carrier includes: when the transmission direction type of the corresponding second time unit of the at least one second component carrier is the flexible or variable transmission direction, skipping, by the terminal device, performing sending and receiving in the corresponding second time unit of the at least one second component carrier.

When the transmission direction types of the corresponding time units of all the second component carriers are flexible or variable transmission directions, and the terminal device does not know whether receiving or sending needs to be performed, the terminal device sets the corresponding time units of all the second component carriers to be idle, and performs neither receiving nor sending. In this way, a working fault of the terminal device can be reduced.

With reference to the first aspect, in a possible implementation, the determining, based on target information, sending and receiving manners of the terminal device in the corresponding second time unit of the at least one second component carrier includes: performing, by the terminal device when no conflict occurs in the transmission direction type of the corresponding second time unit of the at least one second component carrier, sending or receiving in the corresponding second time unit of the at least one second component carrier.

When the transmission direction types of the corresponding time units of the second component carriers do not conflict, the terminal device may perform sending or receiving on the second component carrier. In this way, some or all of the component carriers may be used for sending and receiving, so that the system resources are fully used, and the system efficiency is improved.

With reference to the first aspect, in a possible implementation, the performing, by the terminal device when no conflict occurs in the transmission direction type of the corresponding second time unit of the at least one second component carrier, sending or receiving in the corresponding second time unit of the at least one second component carrier includes: when the first time unit of the first component carrier is semi-statically configured, and the transmission direction type of the corresponding second time unit of the at least one second component carrier includes the uplink transmission direction, if the corresponding second time unit of the at least one second component carrier is semi-statically configured and/or dynamically configured, performing, by the terminal device, sending in the corresponding second time unit of the at least one second component carrier; or when the first time unit of the first component carrier is semi-statically configured, and the transmission direction type of the corresponding second time unit of the at least one second component carrier includes the downlink transmission direction, if the corresponding second time unit of the at least one second component carrier is semi-statically configured and/or dynamically configured, performing, by the terminal device, receiving in the corresponding second time unit of the at least one second component carrier.

With reference to the first aspect, in a possible implementation, the performing, by the terminal device when no conflict occurs in the transmission direction type of the corresponding second time unit of the at least one second component carrier, sending or receiving in the corresponding second time unit of the at least one second component carrier includes: when the first time unit of the first component carrier is dynamically configured, and the transmission direction type of the first time unit of the first component carrier is the uplink transmission direction, if the corresponding second time unit of the at least one second component carrier is semi-statically configured and/or dynamically configured, performing, by the terminal device, sending in the corresponding second time unit of the at least one second component carrier; or when the first time unit of the first component carrier is dynamically configured, and the transmission direction type of the first time unit of the first component carrier is the downlink transmission direction, if the corresponding second time unit of the at least one second component carrier is semi-statically configured and/or dynamically configured, performing, by the terminal device, receiving in the corresponding second time unit of the at least one second component carrier.

When the transmission direction types of the corresponding time units of the second component carriers do not conflict, it is further determined, based on the configuration manner, whether the terminal device performs sending or receiving on the second component carrier, so that priority factors of the dynamic configuration and the semi-static configuration can be fully considered, thereby reducing the working fault of the terminal device.

With reference to the first aspect, in a possible implementation, the determining, based on target information, sending and receiving manners of the terminal device in the corresponding second time unit of the at least one second component carrier includes: when transmission direction types of corresponding second time units of some second component carriers in the at least one second component carrier are flexible or variable transmission directions, a transmission direction type of a corresponding second time unit of a remaining second component carrier is the uplink transmission direction, and the first time unit of the first component carrier is dynamically configured, if not all of the corresponding second time unit of the at least one second component carrier is dynamically configured, skipping, by the terminal device, performing sending in the corresponding second time unit of the at least one second component carrier.

With reference to the first aspect, in a possible implementation, the determining, based on target information, sending and receiving manners of the terminal device in the corresponding second time unit of the at least one second component carrier includes: when transmission direction types of corresponding second time units of some second component carriers in the at least one second component carrier are flexible or variable transmission directions, a transmission direction type of a corresponding second time unit of a remaining second component carrier is the downlink transmission direction, and the first time unit of the first component carrier is dynamically configured, if not all of the corresponding second time unit of the at least one second component carrier is dynamically configured, skipping, by the terminal, performing receiving in the corresponding second time unit of the at least one second component carrier.

When the transmission direction type and/or the configuration manner of the time unit of the component carrier satisfy/satisfies a specific condition, the terminal device may perform sending and receiving on some or all of the component carriers, to fully use the system resources and improve the system efficiency.

With reference to the first aspect, in a possible implementation, the semi-static configuration includes at least one of cell-common slot format configuration, cell-specific slot format configuration, terminal-dedicated slot format configuration, measurement configuration, or semi-statically configured scheduling information; and the dynamic configuration includes at least one of slot format indicator SFI configuration or downlink control information DCI configuration.

With reference to the first aspect, in a possible implementation, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

With reference to the first aspect, in a possible implementation, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

According to a second aspect, a wireless network communication method is provided. The method includes: receiving, by a terminal device, information indicating a transmission direction type of a first time unit of a first component carrier and information indicating a transmission direction type of a corresponding second time unit of at least one second component carrier; and when the first time unit of the first component carrier of the terminal device is semi-statically configured, determining, based on target information, sending and receiving manners of the terminal device in the corresponding second time unit of the at least one second component carrier, where the target information includes at least one of the following information: the transmission direction type of the first time unit of the first component carrier, the transmission direction type of the corresponding second time unit of the at least one second component carrier, and a configuration manner of the corresponding second time unit of the at least one second component carrier.

If different configuration manners are used in a specific cell and another cell, whether to perform sending/receiving based on the configuration manner used in the specific cell or the configuration manner used in the another cell may vary with importance of information configured for the specific cell and the another cell. Therefore, in this case, sending and receiving manners in the specific cell and the another cell need to be specified, to ensure sending/receiving of important information, and improve system efficiency.

With reference to the second aspect, in a possible implementation, the corresponding second time unit of the at least one second component carrier and the first time unit of the first component carrier overlap.

With reference to the second aspect, in a possible implementation, the time unit is at least one of a subframe, a slot, a mini-slot, or a symbol.

With reference to the second aspect, in a possible implementation, the determining, based on target information, sending and receiving manners of the terminal device in the corresponding second time unit of the at least one second component carrier includes: when the transmission direction type of the corresponding second time unit of the at least one second component carrier includes an uplink transmission direction and a downlink transmission direction, skipping, by the terminal device, performing sending and receiving in the corresponding second time unit of the at least one second component carrier.

When the transmission direction types of the corresponding time units of the second component carriers conflict, and the terminal device cannot simultaneously perform sending and receiving, the terminal device sets the corresponding time units of all the second component carriers to be idle, and performs neither receiving nor sending. In this way, a working fault of the terminal device can be reduced.

With reference to the second aspect, in a possible implementation, the determining, based on target information, sending and receiving manners of the terminal device in the corresponding second time unit of the at least one second component carrier includes: when the transmission direction type of the corresponding second time unit of the at least one second component carrier is a flexible or variable transmission direction, skipping, by the terminal device, performing sending and receiving in the corresponding second time unit of the at least one second component carrier.

When the transmission direction types of the corresponding time units of all the second component carriers are flexible or variable transmission directions, and the terminal device does not know whether receiving or sending needs to be performed, the terminal device sets the corresponding time units of all the second component carriers to be idle, and performs neither receiving nor sending. In this way, a working fault of the terminal device can be reduced.

With reference to the second aspect, in a possible implementation, the determining, based on target information, sending and receiving manners of the terminal device in the corresponding second time unit of the at least one second component carrier includes: performing, by the terminal device when no conflict occurs in the transmission direction type of the corresponding second time unit of the at least one second component carrier, sending or receiving in the corresponding second time unit of the at least one second component carrier.

When the transmission direction types of the corresponding second time units of the second component carriers do not conflict, the terminal device may perform sending or receiving on the second component carrier. In this way, some or all of the component carriers may be used for sending and receiving, so that the system resources are fully used, and the system efficiency is improved.

With reference to the second aspect, in a possible implementation, the method further includes: determining, when the first time unit of the first component carrier of the terminal device is semi-statically configured and not all of the corresponding second time unit of the at least one second component carrier is semi-statically configured, whether the terminal device performs sending and receiving in the first time unit of the first component carrier.

With reference to the second aspect, in a possible implementation, the determining, when the first time unit of the first component carrier of the terminal device is semi-statically configured and not all of the corresponding second time unit of the at least one second component carrier is semi-statically configured, whether the terminal device performs sending and receiving in the first time unit of the first component carrier includes: when the transmission direction type of the first time unit of the first component carrier is the uplink transmission direction, and the transmission direction type of the corresponding second time unit of the at least one second component carrier includes the downlink transmission direction, skipping, by the terminal, performing sending in the first time unit of the first component carrier; or when the transmission direction type of the first time unit of the first component carrier is the downlink transmission direction, and the transmission direction type of the corresponding second time unit of the at least one second component carrier includes the uplink transmission direction, skipping, by the terminal, performing receiving in the first time unit of the first component carrier.

With reference to the second aspect, in a possible implementation, the performing, by the terminal device when no conflict occurs in the transmission direction type of the corresponding second time unit of the at least one second component carrier, sending or receiving in the corresponding second time unit of the at least one second component carrier includes: when the first time unit of the first component carrier is semi-statically configured, and the transmission direction type of the corresponding second time unit of the at least one second component carrier includes an uplink transmission direction, if not all of the corresponding second time unit of the at least one second component carrier is semi-statically configured, performing, by the terminal device, sending in the corresponding second time unit of the at least one second component carrier; or when the first time unit of the first component carrier is semi-statically configured, and the transmission direction type of the corresponding second time unit of the at least one second component carrier includes a downlink transmission direction, if not all of the corresponding second time unit of the at least one second component carrier is semi-statically configured, performing, by the terminal device, receiving in the corresponding second time unit of the at least one second component carrier.

With reference to the second aspect, in a possible implementation, the performing, by the terminal device when no conflict occurs in the transmission direction type of the corresponding second time unit of the at least one second component carrier, sending or receiving in the corresponding second time unit of the at least one second component carrier includes: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, performing, by the terminal device, sending in the corresponding second time unit of the at least one second component carrier, and skipping, by the terminal device, performing receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, performing, by the terminal device, receiving in the corresponding second time unit of the at least one second component carrier, and skipping, by the terminal device, performing sending in the first time unit of the first component carrier.

With reference to the second aspect, in a possible implementation, the performing, by the terminal device when no conflict occurs in the transmission direction type of the corresponding second time unit of the at least one second component carrier, sending or receiving in the corresponding second time unit of the at least one second component carrier includes: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, skipping, by the terminal device, performing sending in the corresponding second time unit of the at least one second component carrier, and performing, by the terminal device, receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, skipping, by the terminal device, performing receiving in the corresponding second time unit of the at least one second component carrier, and performing, by the terminal device, sending in the first time unit of the first component carrier.

The foregoing technical solution can ensure that when dynamic configuration is more important than the semi-static configuration, the terminal performs sending/receiving based on a transmission direction of the dynamic configuration. In addition, due to a limitation of a half-duplex operation, when the semi-static configuration and the dynamic configuration have different directions, the terminal device performs sending/receiving based on the transmission direction of the dynamic configuration instead of the transmission direction of the semi-static configuration. Similarly, under some specific conditions, when the semi-static configuration is more important than dynamic configuration, the terminal performs sending/receiving based on a transmission direction of the semi-static configuration. In addition, due to a limitation of a half-duplex operation, when the semi-static configuration and the dynamic configuration have different directions, the terminal performs sending/receiving based on the transmission direction of the semi-static configuration instead of the transmission direction of the dynamic configuration.

Importance in this application may alternatively be replaced with a priority.

With reference to the second aspect, in a possible implementation, the semi-static configuration includes at least one of cell-common slot format configuration, cell-specific slot format configuration, terminal-dedicated slot format configuration, measurement configuration, or semi-statically configured scheduling information.

With reference to the second aspect, in a possible implementation, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

With reference to the second aspect, in a possible implementation, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

According to a third aspect, a terminal device is provided. The terminal device includes: a transceiver, configured to receive information indicating a transmission direction type of a first time unit of a first component carrier and information indicating a transmission direction type of a corresponding second time unit of at least one second component carrier; and a processor, configured to: when the transmission direction type of the first time unit of the first component carrier is a flexible or variable transmission direction, determine, based on target information, sending and receiving manners of the transceiver in the corresponding second time unit of the at least one second component carrier, where the corresponding second time unit of the at least one second component carrier and the first time unit of the first component carrier overlap; and the target information includes at least one of the following information: a configuration manner of the first time unit of the first component carrier, a configuration manner of the corresponding second time unit of the at least one second component carrier, and the transmission direction type of the corresponding second time unit of the at least one second component carrier.

In the technical solution of this application, when the time unit of the first component carrier is a flexible time unit, a corresponding time unit of another component carrier is not directly set to be idle. Instead, the target information related to the component carrier, for example, the transmission direction type and the configuration manner of time unit of the component carrier, is fully considered, to further determine whether the terminal device performs sending or receiving in the corresponding time unit of the another component carrier, so that the terminal device can fully use system resources, thereby improving system efficiency.

With reference to the third aspect, in a possible implementation, the time unit is at least one of a subframe, a slot, a mini-slot, or a symbol.

With reference to the third aspect, in a possible implementation, the processor is specifically configured to: when the transmission direction type of the corresponding second time unit of the at least one second component carrier includes an uplink transmission direction and a downlink transmission direction, indicate the transceiver to skip performing sending and receiving in the corresponding second time unit of the at least one second component carrier.

When the transmission direction types of the corresponding time units of the second component carriers conflict, and the terminal device cannot simultaneously perform sending and receiving, the terminal device sets the corresponding time units of all the second component carriers to be idle, and performs neither receiving nor sending. In this way, a working fault of the terminal device can be reduced.

With reference to the third aspect, in a possible implementation, the processor is specifically configured to: when the transmission direction type of the corresponding second time unit of the at least one second component carrier is the flexible or variable transmission direction, indicate the transceiver to skip performing sending and receiving in the corresponding second time units of the at least one second component carrier.

When the transmission direction types of the corresponding time units of all the second component carriers are flexible or variable transmission directions, and the terminal device does not know whether receiving or sending needs to be performed, the terminal device sets the corresponding time units of all the second component carriers to be idle, and performs neither receiving nor sending. In this way, a working fault of the terminal device can be reduced.

With reference to the third aspect, in a possible implementation, the processor is specifically configured to: when no conflict occurs in the transmission direction type of the corresponding second time unit of the at least one second component carrier, indicate the transceiver to perform sending or receiving in the corresponding second time unit of the at least one second component carrier.

When the transmission direction types of the corresponding time units of the second component carriers do not conflict, the terminal device may perform sending or receiving on the second component carrier. In this way, some or all of the component carriers may be used for sending and receiving, so that the system resources are fully used, and the system efficiency is improved.

With reference to the third aspect, in a possible implementation, the processor is specifically configured to: when the first time unit of the first component carrier is semi-statically configured, and the transmission direction type of the corresponding second time unit of the at least one second component carrier includes an uplink transmission direction, if the corresponding second time unit of the at least one second component carrier is semi-statically configured and/or dynamically configured, indicate the transceiver to perform sending in the corresponding second time unit of the at least one second component carrier; or when the first time unit of the first component carrier is semi-statically configured, and the transmission direction type of the corresponding second time unit of the at least one second component carrier includes a downlink transmission direction, if the corresponding second time unit of the at least one second component carrier is semi-statically configured and/or dynamically configured, indicate the transceiver to perform receiving in the corresponding second time unit of the at least one second component carrier.

When the transmission direction types of the corresponding time units of the second component carriers do not conflict, it is further determined, based on the configuration manner, whether the terminal performs sending or receiving on the second component carrier, so that priority factors of the dynamic configuration and the semi-static configuration can be fully considered, thereby reducing the working fault of the terminal device.

With reference to the third aspect, in a possible implementation, the processor is specifically configured to: when the first time unit of the first component carrier is dynamically configured, and the transmission direction type of the first time unit of the first component carrier is an uplink transmission direction, if the corresponding second time unit of the at least one second component carrier is semi-statically configured and/or dynamically configured, indicate the transceiver to perform sending in the corresponding second time unit of the at least one second component carrier; or when the first time unit of the first component carrier is dynamically configured, and the transmission direction type of the first time unit of the first component carrier is a downlink transmission direction, if the corresponding second time unit of the at least one second component carrier is semi-statically configured and/or dynamically configured, indicate the transceiver to perform receiving in the corresponding second time unit of the at least one second component carrier.

In the technical solution of this application, when the transmission direction type and/or the configuration manner of the time unit of the component carrier satisfy/satisfies a specific condition, the terminal device may perform sending and receiving on some or all of the component carriers, to fully use the system resources and improve the system efficiency.

With reference to the third aspect, in a possible implementation, the semi-static configuration includes at least one of cell-common slot format configuration, cell-specific slot format configuration, terminal-dedicated slot format configuration, measurement configuration, or semi-statically configured scheduling information; and the dynamic configuration includes at least one of slot format indicator SFI configuration or downlink control information DCI configuration.

With reference to the third aspect, in a possible implementation, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

With reference to the third aspect, in a possible implementation, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

According to a fourth aspect, a terminal device is provided. The terminal device includes: a transceiver, configured to receive information indicating a transmission direction type of a first time unit of a first component carrier and information indicating a transmission direction type of a corresponding second time unit of at least one second component carrier; and a processor, configured to: when the first time unit of the first component carrier is semi-statically configured, determine, based on target information, sending and receiving manners of the transceiver in the corresponding second time unit of the at least one second component carrier, where the target information includes at least one of the following information: the transmission direction type of the first time unit of the first component carrier, the transmission direction type of the corresponding second time unit of the at least one second component carrier, and a configuration manner of the corresponding second time unit of the at least one second component carrier.

If different configuration manners are used in a specific cell and another cell, whether to perform sending/receiving based on the configuration manner used in the specific cell or the configuration manner used in the another cell may vary with importance of information configured for the specific cell and the another cell. Therefore, in this case, sending and receiving manners in the specific cell and the another cell need to be specified, to ensure sending/receiving of important information.

With reference to the fourth aspect, in a possible implementation, the corresponding second time unit of the at least one second component carrier and the first time unit of the first component carrier overlap.

With reference to the fourth aspect, in a possible implementation, the time unit is at least one of a subframe, a slot, a mini-slot, or a symbol.

With reference to the fourth aspect, in a possible implementation, the processor is specifically configured to: when the transmission direction type of the corresponding second time unit of the at least one second component carrier includes an uplink transmission direction and a downlink transmission direction, indicate the transceiver to skip performing sending and receiving in the corresponding second time unit of the at least one second component carrier.

When the transmission direction types of the corresponding time units of the second component carriers conflict, and the terminal device cannot simultaneously perform sending and receiving, the terminal device sets the corresponding time units of all the second component carriers to be idle, and performs neither receiving nor sending. In this way, a working fault of the terminal device can be reduced.

With reference to the fourth aspect, in a possible implementation, the processor is specifically configured to: when the transmission direction type of the corresponding second time unit of the at least one second component carrier is a flexible or variable transmission direction, indicate the transceiver to skip performing sending and receiving in the corresponding second time unit of the at least one second component carrier.

When the transmission direction types of the corresponding time units of all the second component carriers are flexible or variable transmission directions, and the terminal device does not know whether receiving or sending needs to be performed, the terminal device sets the corresponding time units of all the second component carriers to be idle, and performs neither receiving nor sending. In this way, a working fault of the terminal device can be reduced.

With reference to the fourth aspect, in a possible implementation, the processor is specifically configured to: when no conflict occurs in the transmission direction type of the corresponding second time unit of the at least one second component carrier, indicate the transceiver to perform sending or receiving in the corresponding second time unit of the at least one second component carrier.

When the transmission direction types of the corresponding time units of the second component carriers do not conflict, the terminal device may perform sending or receiving on the second component carrier. In this way, some or all of the component carriers may be used for sending and receiving, so that the system resources are fully used, and the system efficiency is improved.

With reference to the fourth aspect, in a possible implementation, the processor is further configured to: when the first time unit of the first component carrier of the terminal device is semi-statically configured and not all of the corresponding second time unit of the at least one second component carrier is semi-statically configured, determine whether the transceiver performs sending and receiving in the first time unit of the first component carrier.

With reference to the fourth aspect, in a possible implementation, the processor is specifically configured to: when the transmission direction type of the first time unit of the first component carrier is the uplink transmission direction, and the transmission direction type of the corresponding second time unit of the at least one second component carrier includes the downlink transmission direction, indicate the transceiver to skip performing sending in the first time unit of the first component carrier; or when the transmission direction type of the first time unit of the first component carrier is the downlink transmission direction, and the transmission direction type of the corresponding second time unit of the at least one second component carrier includes the uplink transmission direction, indicate the transceiver to skip performing receiving in the first time unit of the first component carrier.

With reference to the fourth aspect, in a possible implementation, the processor is specifically configured to: when the first time unit of the first component carrier is semi-statically configured, and the transmission direction type of the corresponding second time unit of the at least one second component carrier includes an uplink transmission direction, if not all of the corresponding second time unit of the at least one second component carrier is semi-statically configured, indicate the transceiver to perform sending in the corresponding second time unit of the at least one second component carrier; or when the first time unit of the first component carrier is semi-statically configured, and the transmission direction type of the corresponding second time unit of the at least one second component carrier includes a downlink transmission direction, if not all of the corresponding second time unit of the at least one second component carrier is semi-statically configured, indicate the transceiver to perform receiving in the corresponding second time unit of the at least one second component carrier.

With reference to the fourth aspect, in a possible implementation, the processor is specifically configured to: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, indicate the transceiver to perform sending in the corresponding second time unit of the at least one second component carrier, and indicate the transceiver to skip performing receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, indicate the transceiver to perform receiving in the corresponding second time unit of the at least one second component carrier, and indicate the transceiver to skip performing sending in the first time unit of the first component carrier.

With reference to the fourth aspect, in a possible implementation, the processor is specifically configured to: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, indicate the transceiver to skip performing sending in the corresponding second time unit of the at least one second component carrier, and indicate the transceiver to perform receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, indicate the transceiver to skip performing receiving in the corresponding second time unit of the at least one second component carrier, and indicate the transceiver to perform sending in the first time unit of the first component carrier.

The foregoing technical solution can ensure that when dynamic configuration is more important than the semi-static configuration, the terminal performs sending/receiving based on a transmission direction of the dynamic configuration. In addition, due to a limitation of a half-duplex operation, when the semi-static configuration and the dynamic configuration have different directions, the terminal performs sending/receiving based on the transmission direction of the dynamic configuration instead of the transmission direction of the semi-static configuration. Similarly, under some specific conditions, when the semi-static configuration is more important than dynamic configuration, the terminal device performs sending/receiving based on a transmission direction of the semi-static configuration. In addition, due to a limitation of a half-duplex operation, when the semi-static configuration and the dynamic configuration have different directions, the terminal device performs sending/receiving based on the transmission direction of the semi-static configuration instead of the transmission direction of the dynamic configuration.

Importance in this application may alternatively be replaced with a priority.

With reference to the fourth aspect, in a possible implementation, the semi-static configuration includes at least one of cell-common slot format configuration, cell-specific slot format configuration, terminal-dedicated slot format configuration, measurement configuration, or semi-statically configured scheduling information.

With reference to the fourth aspect, in a possible implementation, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

With reference to the fourth aspect, in a possible implementation, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

According to a fifth aspect, a communications apparatus is provided. The apparatus includes a module configured to perform the first aspect or any one of the possible implementations of the first aspect.

Optionally, the communications apparatus according to the fifth aspect may be a terminal device, or may be a component (for example, a chip or a circuit) used for a terminal device.

According to a sixth aspect, a communications apparatus is provided. The apparatus includes a module configured to perform the second aspect or any one of the possible implementations of the second aspect.

Optionally, the communications apparatus according to the sixth aspect may be a terminal device, or may be a component (for example, a chip or a circuit) used for a terminal device.

According to a seventh aspect, a chip is provided. The chip is configured to perform the method according to the first aspect or any one of the possible implementations of the first aspect.

According to an eighth aspect, a chip is provided. The chip is configured to perform the method according to the second aspect or any one of the possible implementations of the second aspect.

According to a ninth aspect, a computer-readable storage medium is provided. The computer-readable storage medium stores an instruction. When the instruction is run on a computer, the computer is enabled to perform the method according to the first aspect or any one of the possible implementations of the first aspect.

According to a tenth aspect, a computer-readable storage medium is provided. The computer-readable storage medium stores an instruction. When the instruction is run on a computer, the computer is enabled to perform the method according to the second aspect or any one of the possible implementations of the second aspect.

According to an eleventh aspect, a computer program product including an instruction is provided. When the computer program product runs on a computer, the computer is enabled to perform the method according to the first aspect or any one of the possible implementations of the first aspect.

According to a twelfth aspect, a computer program product including an instruction is provided. When the computer program product runs on a computer, the computer is enabled to perform the method according to the second aspect or any one of the possible implementations of the second aspect.

According to a thirteenth aspect, a communications system is provided. The communications system includes a network device and the terminal device according to the third aspect or any one of the possible implementations of the third aspect.

According to a fourteenth aspect, a communications system is provided. The communications system includes a network device and the terminal device according to the fourth aspect or any one of the possible implementations of the fourth aspect.

BRIEF DESCRIPTION OF THE DRAWINGS

FIG. 2 is a schematic diagram of resources used for multi-carrier aggregation to which an embodiment of this application is applied;

FIG. 3 is a schematic flowchart of a wireless network communication method according to an embodiment of this application;

FIG. 7 is a schematic diagram of a communication resource according to still another embodiment of this application;

FIG. 8 is a schematic flowchart of a wireless network communication method according to another embodiment of this application;

DETAILED DESCRIPTION OF ILLUSTRATIVE EMBODIMENTS

Figure 1:
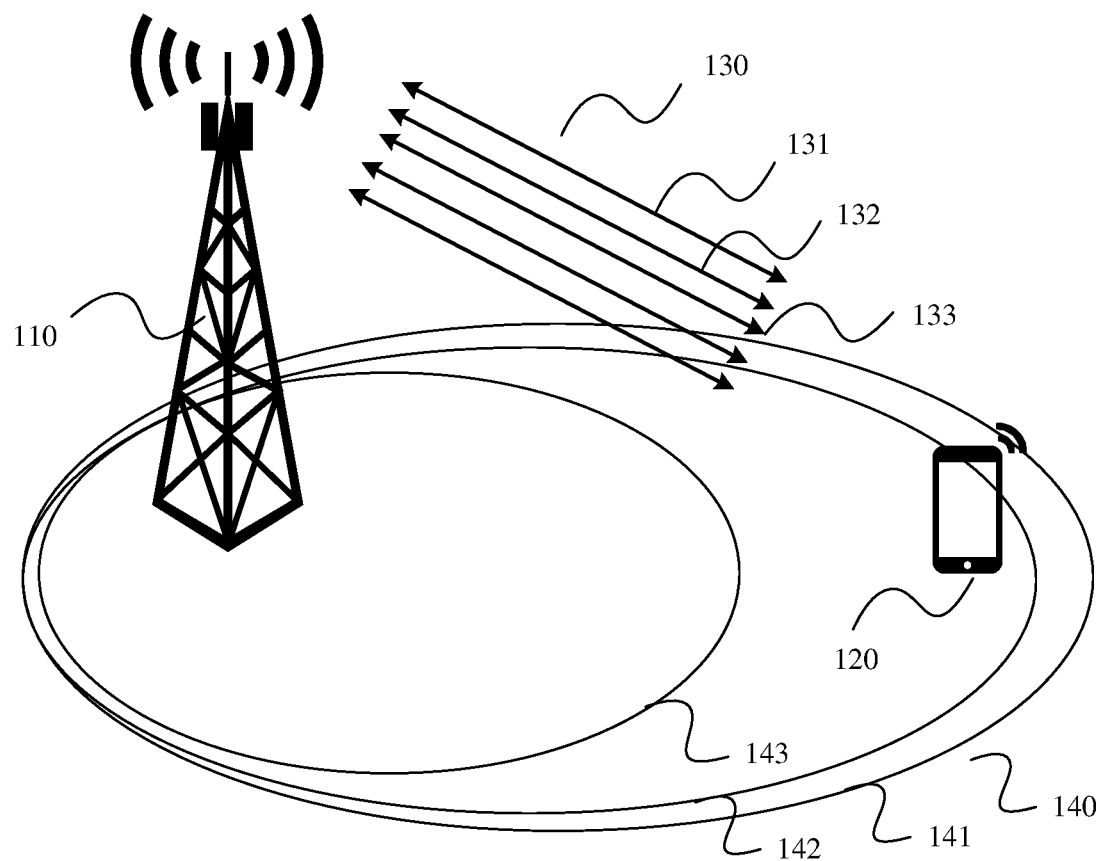
FIG. 1 is a schematic diagram of an application scenario according to an embodiment of this application.

The following describes technical solutions of embodiments in this application with reference to accompanying drawings.

The 3rd generation partnership project (3GPP) long term evolution-advanced (LTE-A) Rel-10/11/12/13/14 version is an enhancement of the long term evolution (LTE) Rel-8/9 version. An LTE-A system has a higher bandwidth requirement than an LTE system, and supports a peak data rate of up to 1 Gbit/s in a downlink and 500 Mbit/s in an uplink. To satisfy the requirement of the LTE-A system, the LTE-A system uses a carrier aggregation (CA) technology as a method for expanding a system bandwidth, and uses a multi-antenna enhancement/multiple-input multiple-output (MIMO) technology and a coordinated multipoint transmission/reception (CoMP) technology to improve a data rate and system performance.

Carrier aggregation is a technology to aggregate two or more component carriers (CC) to support a higher transmission bandwidth. Currently, a maximum bandwidth of each component carrier is 20 MHz, and a maximum transmission bandwidth of 100 MHz may be implemented after carrier aggregation, thereby effectively increasing uplink and downlink transmission rates. A terminal device may determine, based on a capability of the terminal device, a maximum quantity of component carriers that can be simultaneously used for uplink and downlink transmission.

In this application, the "component carrier" may be referred to as a carrier for short.

In this application, "implicitly represented" may be replaced with "implicitly indicated".

In this application, information indicating a transmission direction type may include either or both of explicit indication information and implicit indication information. The explicit indication information includes any one or more of semi-static slot configuration, dedicated slot configuration, or a dynamic slot format indicator (SFI). The implicit indication information includes any one of dynamic scheduling information, measurement configuration information, or semi-statically configured scheduling information.

For example, the semi-static slot configuration may be time division multiplexed transmission direction common configuration (TDD-UL-DL-ConfigurationCommon). The dedicated slot configuration may be time division multiplexed transmission direction dedicated configuration (or time division multiplexed transmission direction specific configuration) (TDD-UL-DL-ConfigDedicated). The dynamic SFI is downlink control information (DCI), for example, DCI 2_0, used to indicate an SFI. The information may explicitly indicate whether a transmission direction is a downlink transmission direction, an uplink transmission direction, or a flexible transmission direction.

The dynamic scheduling information may be DCI used for uplink scheduling or DCI used for downlink scheduling. The DCI used for uplink scheduling includes DCI 0_0, DCI 0_1, DCI 2_3, or any newly defined DCI format. The information implicitly indicates that a transmission direction is an uplink transmission direction. The DCI used for downlink scheduling includes DCI 1_0, DCI 1_1, or any newly defined DCI format. The information implicitly indicates that a transmission direction is a downlink transmission direction. The measurement configuration information includes measurement configuration information for a synchronization signal, measurement configuration information for a physical broadcast channel (PBCH), or measurement configuration information for channel measurement. The measurement configuration information for the synchronization signal further includes measurement configuration information for a synchronization position, measurement configuration information for a synchronization signal block, measurement configuration information for a synchronization signal burst, or measurement configuration information for a synchronization signal burst set. The information implicitly indicates that a transmission direction is a downlink transmission direction. The measurement configuration information may be configuration information for performing measurement in a measurement window. The measurement configuration information may be configured by using radio resource control (RRC) signaling. The measurement configuration information for the channel measurement may include measurement configuration information for a channel state information reference signal (CSI-RS), a cell-specific reference signal (CRS), or a demodulation reference signal (DMRS); or measurement configuration information for a sounding reference signal (SRS). The measurement configuration information for the CSI-RS/CRS/DMRS implicitly indicates that a transmission direction is a downlink transmission direction, and the measurement configuration information for the SRS implicitly indicates that a transmission direction is an uplink transmission direction. The semi-statically configured scheduling information includes a semi-statically scheduled physical downlink shared channel (PDSCH), physical uplink shared channel (PUSCH), control resource set (CORSET) detection, physical uplink control channel (PUCCH), or physical random access channel (PRACH). The PDSCH or the CORSET detection implicitly indicates that a transmission direction is a downlink transmission direction, and the PUSCH, the PUCCH, or the PRACH implicitly indicates that a transmission direction is an uplink transmission direction.

In this application, the measurement configuration information is information used to configure synchronization/broadcast channel measurement or channel state measurement. Measurement configuration in this application may alternatively be replaced with radio resource control (RRC) configuration. The measurement configuration information in this application may alternatively be replaced with radio resource control (RRC) configuration information.

In this application, "no conflict" may be understood as that an uplink transmission direction and a downlink transmission direction are not simultaneously included.

A sent or received object in this application may be data, or may be another object. For example, control information, data information, or a reference signal is sent. Similarly, for example, control information, data information, a reference signal, a synchronization signal, or a broadcast channel is received.

A first component carrier is a primary component carrier, or is referred to as a primary cell. The first component carrier is a primary component carrier in a secondary component carrier, or is referred to as a primary cell (primary secondary cell) in a secondary cell.

FIG. 1 is a schematic diagram of an application scenario according to an embodiment of this application. A communications network architecture shown in FIG. 1 includes a base station 110 and a terminal device 120.

The base station 110 may be configured to connect the terminal device to a radio access network (RAN). Therefore, the base station may also be referred to as an access network device or an access network node sometimes. It may be understood that in systems using different radio access technologies, a device having a base station function may have different names. For ease of description, in the embodiments of this application, apparatuses that provide a wireless communication access function for a terminal are collectively referred to as base stations. The base station 110 may be, for example, an evolved NodeB (eNB) in long term evolution (LTE), a next generation NodeB (gNB) in a 5th generation (the fifth generation, 5G) system, a transmission reception point (transmission reception point, TRP), or a network device in a 5G network. The base station 110 may be a macro base station, or may be a micro base station. Coverage of one base station 110 may include one cell, or may include a plurality of cells.

The terminal device 120 may communicate with one or more core networks (CN) through an access network device. The terminal device may also be referred to as user equipment (UE), an access terminal, a terminal, a subscriber unit, a subscriber station, a mobile station, a remote station, a remote terminal, a mobile device, a user terminal, a wireless network device, a user agent, or a user apparatus. The terminal may be a cellular phone (cellular phone), a cordless phone, a session initiation protocol (SIP) phone, a smartphone (smartphone), a wireless local loop (WLL) station, a personal digital assistant (PDA), a handheld device having a wireless communication function, a computing device, another device connected to a wireless modem, a vehicle-mounted device, a wearable device, an unmanned aerial vehicle device, a terminal in an internet of things or an internet of vehicles, a terminal in any form in a future network, relay user equipment, a terminal in a future evolved public land mobile network (PLMN), or the like. This is not limited in the embodiments of this application. For ease of description, in the embodiments of this application, terminal devices supporting carrier aggregation are collectively referred to as terminal devices. In some embodiments, the terminal device may alternatively be identified by using a UE identifier.

When uplink and downlink transmission may be performed between the base station 110 and the terminal device 120 on a carrier 130, for the terminal device 120 that supports the carrier aggregation, the following two manners may be used.

In one manner, the terminal device 120 does not enable a carrier aggregation function, the terminal device 120 can access only one carrier at the same time, and the terminal device 120 can perform uplink and downlink data transmission and the like on the carrier, but a transmission rate of the terminal device 120 is constrained by a single-carrier bandwidth. For example, the terminal device 120 may access a single carrier 131, a single carrier 132, or another separate carrier shown in FIG. 1, and then transmit data on the accessed single carrier.

In the other manner, the terminal device 120 enables a carrier aggregation function, and the terminal device 120 may simultaneously access two or more carriers, and simultaneously transmit uplink and downlink data on the two or more carriers. Therefore, a data transmission rate can be greatly increased. For example, the terminal device 120 may simultaneously access carriers 131 and 132 shown in FIG. 1, or simultaneously access carriers 131, 132, and 133 shown in FIG. 1, and then the terminal device 120 may simultaneously transmit data by using resources on a plurality of carriers accessed by the terminal device 120, to maximize resource utilization.

When the terminal device 120 performs carrier aggregation, the terminal device 120 may aggregate a plurality of carriers configured by the base station 110. To be specific, when the terminal device 120 performs uplink carrier aggregation, the terminal device 120 may aggregate a plurality of uplink carriers configured by the base station 110; or when the terminal device 120 performs downlink carrier aggregation, the terminal device 120 may aggregate a plurality of downlink carriers configured by the base station 110. Alternatively, when the terminal device 120 performs carrier aggregation, the terminal device 120 may select, from a set that includes a plurality of carriers and that is configured by the base station 110, a plurality of carriers and aggregate the plurality of selected carriers. To be specific, when the terminal device 120 performs uplink carrier aggregation, the terminal device 120 may select, from a set that includes a plurality of uplink carriers and that is configured by the base station 110, a plurality of uplink carriers and aggregate the plurality of selected uplink carriers. When the terminal device 120 performs downlink carrier aggregation, the terminal device 120 may select, from a set that includes a plurality of downlink carriers and that is configured by the base station 110, a plurality of downlink carriers, and aggregate the plurality of selected downlink carriers.

It should be understood that the application scenario according to this embodiment of this application is a scenario in which the terminal device performs carrier aggregation.

To make more efficient use of fragmented carrier spectrums, carrier aggregation supports aggregation of different carriers. For example, a plurality of carriers in a same frequency band may be aggregated, so that a user can transmit data on the plurality of carriers in the same frequency band, where the carrier aggregation in the same frequency band may further be classified into consecutive-carrier aggregation and inconsecutive-carrier aggregation. Alternatively, a plurality of carriers in different frequency bands may be aggregated, so that a user can transmit data on the plurality of carriers in the different frequency bands. Alternatively, a plurality of carriers having a same bandwidth or different bandwidths may be aggregated. In the embodiments of this application, each carrier aggregated by the terminal device is referred to as a component carrier (CC), and a terminal device for which a carrier aggregation function is configured is referred to as a carrier aggregation terminal device, which may also be referred to as a CA terminal device or a CA user in another embodiment.

It should be understood that the component carrier shown in FIG. 1 is merely an example, and constitutes no limitation on the embodiments of this application.

To better understand the technical solutions in the embodiments of this application, the following briefly describes related technical terms.

Each component carrier corresponds to an independent cell (cell). In a carrier aggregation scenario, there are the following types of cells:

Primary cell (PCell): The primary cell is a cell working in a primary frequency band. A terminal device performs an initial connection establishment process or starts a connection re-establishment process in the cell, and the cell is indicated as the primary cell in a handover process.

Secondary cell (SCell): The secondary cell is a cell working in a secondary frequency band. Once a radio resource control (RRC) connection is established, the secondary cell may be configured to provide an additional radio resource. A PCell and an SCell are user-level concepts for CA users. A carrier initially accessed by a user is a PCell of the CA user. Different terminal devices may have different primary cells and serving cell sets.

Serving cell set: If a CA function is not configured for a terminal device in a radio resource control connected mode, there is only one serving cell, namely, a PCell. If a CA function is configured for a terminal device in a radio resource control connected mode, the serving cell set includes a PCell and all SCells. A serving cell may indicate a primary cell PCell, or may indicate a secondary cell SCell.

Primary component carrier (PCC): The primary component carrier is a component carrier corresponding to the primary cell PCell.

Secondary component carrier (SCC): The secondary component carrier is a component carrier corresponding to the secondary cell SCell. Each component carrier has a corresponding index, an index of the primary component carrier is fixed to 0, and an index of a secondary component carrier of each terminal device may be sent to the terminal device by using terminal device-specific radio resource control (RRC) signaling.

The network architecture shown in FIG. 1 is used as an example. A serving cell set 140 of the terminal device 120 may include a cell 141, a cell 142, and a cell 143. One cell is a primary cell, and the other cells are secondary cells. The secondary cell may further include a primary secondary cell (PSCell).

It should be noted that the foregoing descriptions of the serving cell set, the primary cell, and the secondary cell of the terminal device 120 are merely used as examples. In a specific implementation, the serving cell set may alternatively include more or fewer cells, and positions and coverage of cells corresponding to component carriers may alternatively be different. This is not limited in this application. A quantity of component carriers aggregated by the terminal device is not limited in this application either.

As mentioned above, uplink and downlink transmission may be performed between the base station and the terminal device on a carrier. A transmission link from the base station to the terminal device is a downlink, and a transmission link from the terminal device to the base station is an uplink. A physical control channel and a physical shared channel (which is used to transmit data and may also be referred to as a data channel) are defined for both the uplink and downlink.

A physical uplink channel includes a physical uplink control channel (PUCCH), a physical uplink shared channel (PUSCH), and a physical random access channel (PRACH). The control channel and the data channel are frequency division multiplexed.

A physical downlink channel includes a physical downlink control channel (PDCCH), a physical downlink shared channel (PDSCH), a physical control format indicator channel (PCFICH), a physical hybrid ARQ indicator channel (PHICH), a physical broadcast channel (PBCH), and a physical multicast channel (PMCH). The control channel and the data channel are time division multiplexed.

Information carried on the physical downlink control channel PDCCH is downlink control information (DCI), and the DCI includes some information, for example, resource allocation and a modulation and demodulation scheme, about a PDSCH/PUSCH. DCI formats include 13 types such as a DCI format 0/1/1A/1B/1C/1D/2/2A/2B/2C/3/3A/4. The DCI format 0/4 is used to schedule the PUSCH, and is referred to as an uplink scheduling grant command (UL grant); the DCI format 1/1A/1B/1C/1D/2/2A/2B/2C is used to schedule the PDSCH, and is referred to as a downlink scheduling grant command (DL grant); and the DCI format 3/3A is used to indicate a group of closed-loop power control commands of UE.

The time division multiplexing (TDM) is dividing a time provided for information transmission on an entire channel into several time slices (where the time slice is referred to as a slot for short), and allocating the slots to one or more signal source for use. Each signal exclusively occupies the channel in the slot of the signal for data transmission. A time-frequency resource in an LTE system is divided into a plurality of 10-ms radio frames in time domain, one radio frame includes 10 1-ms subframes, one subframe includes two slots (slot), and each slot includes seven symbols (symbol) or six symbols. In a 5th generation (5G) technology, a new radio access technology is defined, and a plurality of subcarrier spacings are introduced. Different carriers may have different subcarrier spacings, and correspondingly have a plurality of symbol lengths and slot lengths. In a 5G new radio access technology (5th generation new radio access technology, 5G NR) system, in time domain, one slot may include at least one of downlink transmission, a guard gap, uplink transmission, and the like. Such composition of the slot is referred to as different slot format indicators (SFI). There may be a maximum of 256 SFIs. The following describes some of the SFIs for example.

TABLE 1

Different slot formats

| | Serial number of a symbol in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 7 | D | D | D | D | D | D | D | D | D | X | X | X | X | X |
| 15 | X | X | X | X | X | X | U | U | U | U | U | U | U | U |
| 27 | D | D | D | X | X | X | X | X | X | X | X | U | U | U |
| 47 | D | D | X | U | U | U | U | D | D | X | U | U | U | U |

Table 1 lists some possible different slot formats. Different slot formats include different quantities of uplink symbols, downlink symbols, and flexible symbols. The flexible symbol may be used for a guard gap. Different slot types may also include different quantities of symbols. For example, a mini slot includes fewer than seven symbols (for example, one symbol, two symbols, or four symbols), and a common slot includes seven symbols or 14 symbols. As shown in Table 1, a symbol marked as "D" is a downlink (DL) symbol, a symbol marked as "U" is an uplink (UL) symbol, and a symbol marked as "X" is a guard gap symbol, which may also be referred to as a flexible (flexible or unknown) symbol. In this application, X may alternatively be replaced with F.

The slot format may be semi-statically or dynamically configured. A semi-static signaling indication is used to notify, by using RRC signaling, UE of a transmission status in each slot and on each symbol in a periodicity, the transmission status includes an uplink status, a downlink status, and a flexible status, and corresponding symbol types are respectively an uplink symbol, a downlink symbol, and a flexible symbol. When the transmission status on the symbol is the uplink status, the UE may send a signal on a corresponding symbol (namely, the uplink symbol UL or U). When the transmission status on the symbol is the downlink status, the UE may receive a signal on a corresponding symbol (namely, the downlink symbol DL or D). When the transmission status on the symbol is the flexible status, the UE neither receives a signal nor sends a signal on a corresponding symbol (namely, the flexible symbol X or F), and the symbol may also be understood as an idle symbol. Semi-static signaling indicates cell configuration, that is, all UEs in a cell can receive the semi-static configuration.

A dynamic signaling indication, for example, DCI signaling, is used to notify UE of a slot format in one or more slots in a periodicity. The DCI signaling is also referred to as a dynamic SFI. Specifically, the DCI signaling is delivered by using DCI 2_0. Dynamic signaling that is notified by using the DCI 2_0 may overwrite a symbol status indicated by flexible or unknown in the semi-static signaling.

Several symbol status combinations of a plurality of slots may further be predefined in NR. Specifically, a base station configures a group of slot format combinations in one or more slots by using RRC signaling. A combined sequence number entry identifier (entry ID) may be used to indicate a specific slot format. In addition, a DCI message may dynamically indicate the slot format combination in the one or more slots. The following uses an example for description. Refer to Table 2.

TABLE 2

Slot format combination

| Entry | Slot 1 | Slot 2 | Slot 3 | ... | Slot m | ... | Slot n | ... | Slot 256 |
|---|---|---|---|---|---|---|---|---|---|
| 1 | S1 | S2 | S3 | ... | Sm | | | | |
| 2 | S1 | S2 | S3 | ... | Sm | ... | Sn | | |
| ... | | | | | | | | | |
| 212 | S1 | S2 | S3 | ... | Sm | ... | Sn | ... | S256 |
| ... | | | | | | | | | |
| 512 | S1 | S2 | S3 | ... | Sm | ... | | | |

Table 2 shows some slot format combinations. A process of indicating the slot format combination in the table by using the DCI message may be as follows: The base station first delivers a configured entry identifier and a corresponding specific slot format table to UE by using RRC signaling, where row identifiers in the table are different slots in the combination, vertical identifiers are entry identifiers, and the table includes a possible slot format combination of each entry; and then, a corresponding configuration of a corresponding carrier may be indicated as an entry identifier in the table by using a dynamic SFI (namely, DCI signaling, which may be specifically DCI 2_0). As shown in Table 3, DCI is carried on a physical downlink control channel. Each SFI index in the DCI (which may be specifically the DCI 2_0) is an entry identifier of a slot format combination, and the DCI may carry SFI indexes of 16 cells in total. The base station configures the UE to detect the physical downlink control channel at intervals of a period of time, and receive an information indication of an SFI. The period of time may be referred to as a monitor periodicity.

TABLE 3

SFI indexes that are of a plurality of cells and that are in a dynamic SFI

SFI index 1, SFI index 2, ... , and SFI index 1

The base station indicates a slot format to the UE, and the UE may send or receive signals in different time units based on transmission direction types of the different time units in the slot format. For example, the UE may send or receive signals on different symbols or in different slots based on transmission direction types of the different symbols or the different slots in the slot format. The following provides detailed descriptions with reference to FIG. 2.

FIG. 2 is a schematic diagram of resources used for multi-carrier aggregation to which this application is applicable. As shown in FIG. 2, a carrier CC 1, a carrier CC 2, and a carrier CC 3 shown in FIG. 2 are all component carriers aggregated by a terminal device, and the terminal device may perform communication on the component carriers. A quantity of component carriers participating in the carrier aggregation in FIG. 2 is merely an example. The embodiments of this application may be applied to a scenario in which there are any quantity of carriers, for example, there may be only two component carriers, or there may be more component carriers, such as three or more component carriers.

A first component carrier CC 1 in frequency domain may be a specific carrier for the carrier aggregation, and may also be referred to as a reference carrier, for example, may be a primary component carrier, or a primary component carrier in a secondary component carrier (namely, a primary cell in a secondary cell), or a component carrier having a smallest cell index among all component carriers of the terminal device, or a component carrier having a smallest cell index among all component carriers to which this application is applied. Certainly, the first component carrier may alternatively be a component carrier corresponding to a cell having a largest cell index, or a component carrier formulated in a specific manner. The component carrier formulated in the specific manner may be an intermediate carrier, or a corresponding carrier selected based on a sequence (for example, a frequency hopping sequence).

Second component carriers CC 2 and CC 3 in frequency domain are different from the first component carrier CC 1. Each component carrier is divided into several time units in time domain, for example, small blocks S11 to S14, S21 to S24, S31 to S34, and S41 to S44 on each component carrier of the CC 1 to CC 3 in FIG. 2. An example of the time unit may include a subframe, a slot, a mini slot, a symbol, or the like. The mini slot is one symbol or several symbols, and the several symbols may be any one of two, three, four, five, or seven symbols.

Transmission direction types of a time unit of a component carrier may include three types: an uplink transmission direction UL, a downlink transmission direction DL, or a flexible or variable transmission direction X. UL indicates that the terminal device may perform sending in the time unit; DL indicates that the terminal device may perform receiving in the time unit; and X indicates that the terminal device may perform neither sending nor receiving in the time unit. Flexible or variable may also be referred to as unknown, an unknown status, a flexible status, flexible, direction configurable (configurable), or the like.

In a time domain direction, time units of different component carriers may be aligned with each other (or may completely overlap). For example, the first time unit 51 of the first component carrier CC 1 is aligned with the second time unit S21 of the second component carrier CC 2. However, due to various reasons, the time units of the component carrier may be misplaced to some extent. As a result, corresponding time units of two component carriers only partially overlap. For example, the first time unit S11 of the first component carrier CC 1 corresponds to the second time unit S31 of the second component carrier CC 3, and the two time units S11 and S31 partially overlap. Regardless of whether overlapping (overlap) between two time units is complete overlapping or partial overlapping, because the terminal device works in a half-duplex working mode, and can only perform receiving or sending at a same moment, transmission direction types of the time units S11, S21, and S31 are constrained by the half-duplex working mode, and no conflict is allowed. In this specification of this application, a case in which transmission direction types of corresponding time units of different component carriers include both UL and DL is referred to as a transmission direction type conflict. For example, transmission direction types of the corresponding time units S11, S21, and S31 of the CC 1 to the CC 3 in FIG. 2 conflict. On the contrary, another case, in which transmission direction types of corresponding time units of different component carriers do not include both UL and DL, for example, the transmission direction types of the corresponding time units of the different component carriers are all UL, or are all DL, or are only two types: UL and X, or are only two types: DL and X, is referred to as no transmission direction type conflict. For example, transmission direction types of the corresponding time units S12, S22, and S32 of the CC 1 to the CC 3 in FIG. 2 do not conflict.

Specifically, a terminal device that cannot perform full-duplex communication is used as an example, the terminal device cannot simultaneously perform sending and receiving on a same frequency resource in a same time domain, or cannot simultaneously perform sending and receiving on different frequency resources in a same time domain. In the different frequency resources in the same time domain, the different frequency resources may be intra-band (also referred to as intra-frequency) resources or inter-band (also referred to as inter-frequency) resources. That simultaneous sending and receiving cannot be performed may be that sending and receiving cannot be simultaneously performed in fully aligned time units, and only sending or receiving can be performed in the fully aligned time units; or sending and receiving cannot be simultaneously performed in time units that overlap (or referred to as time units that are incompletely aligned), and only sending or receiving can be performed in the time units that overlap (or referred to as the time units that are incompletely aligned). There are three cases of overlap between time units: (1) a plurality of time units are completely aligned at a timing; or (2) a plurality of time units are not aligned at a timing but the plurality of time units partially overlap; or (3) a plurality of time units are not aligned at a timing, but one time unit is completely included in another time unit. For example, when a plurality of carriers have different numerologies, a time unit of one carrier may be less than a time unit of another carrier. In this case, the foregoing cases (2) and (3) may occur.

An example in which the plurality of carriers have the different numerologies is as follows: The numerology usually includes a subcarrier spacing (SCS). A subcarrier spacing SCS of a carrier 1 is 15 kHz, an SCS of a carrier 2 is 30 kHz, and a length of one symbol of the carrier 1 is equal to lengths of two symbols of the carrier 2. In this case, different transmission directions may be configured for the two symbols of the carrier 2. For example, a downlink transmission direction is configured for a symbol 1, an uplink transmission direction is configured for a symbol 2, and the downlink transmission direction may be configured for the symbol of the carrier 1. Although the symbol 1 of the carrier 2 and the symbol of the carrier 1 have the same direction, the symbol 2 of the carrier 2 and the symbol of the carrier 1 have different directions. If the symbol of the carrier 1 is exactly aligned with the symbol 1 and the symbol 2 of the carrier 2 at a timing, two premises need to be considered for how to perform sending or receiving. Premise 1: If the carrier 1 is a specific carrier or a reference carrier (for example, the carrier 1 is a primary carrier), the terminal device performs receiving on the carrier 1, the terminal device can perform receiving on the symbol 1 of the carrier 2, and the terminal device cannot perform sending on the symbol 2 of the carrier 2. Premise 2: If the carrier 2 is a specific carrier or a reference carrier (for example, the carrier 2 is a primary carrier), the transmission direction of the symbol of the carrier 1 and the transmission direction of the symbol 2 of the carrier 2 conflict, the terminal device cannot perform receiving on the carrier 1, the terminal device can perform receiving on the symbol 1 of the carrier 2, and the terminal device cannot perform sending on the symbol 2 of the carrier 2. Therefore, aggregation of carriers having different numerologies is summarized as follows:

When a plurality of carriers having different numerologies are aggregated, if a first carrier having a first numerology is a reference carrier, the terminal device performs sending or receiving in a first time unit of the first carrier based on a configured transmission direction; the terminal device performs sending or receiving in a second time unit of a second carrier depending on whether a configured transmission direction conflicts with the transmission direction of the first time unit of the first carrier; and the terminal device performs sending or receiving in a third time unit of the second carrier depending on whether a configured transmission direction conflicts with the transmission direction of the first time unit of the first carrier, where the first carrier has the first numerology, the second carrier has a second numerology, the first numerology is less than the second numerology, the second time unit of the carrier having the second numerology and the first time unit of the carrier having the first numerology overlap, and the third time unit of the carrier having the second numerology and the first time unit of the carrier having the first numerology overlap. Specifically, the performing, by the terminal device, sending or receiving in a second time unit of a second carrier depending on whether a configured transmission direction conflicts with the transmission direction of the first time unit of the first carrier includes: when the transmission direction of the second time unit of the second carrier is consistent with the transmission direction of the first time unit of the first carrier, performing, by the terminal device, sending or receiving in the second time unit of the second carrier based on the configured transmission direction; and/or when the transmission direction of the third time unit of the second carrier is inconsistent with the transmission direction of the first time unit of the first carrier, skipping, by the terminal device, performing sending or receiving in the third time unit of the second carrier. The second carrier may further be extended to a plurality of second carriers. To be specific, the second carrier may be at least one second carrier. Therefore, the second time unit may be a corresponding time unit of the at least one second carrier.

When a plurality of carriers having different numerologies are aggregated, if a second carrier having a second numerology is a reference carrier, the terminal device performs sending or receiving in a second time unit of the second carrier based on a configured transmission direction; the terminal device performs sending or receiving in a third time unit of the second carrier based on a configured transmission direction; and the terminal device performs sending or receiving in a first time unit of a first carrier depending on whether a configured transmission direction conflicts with the transmission direction of the second time unit of the second carrier and the transmission direction of the third time unit of the second carrier, where the first carrier has a first numerology, the second carrier has the second numerology, the first numerology is less than the second numerology, the second time unit of the carrier having the second numerology and the first time unit of the carrier having the first numerology overlap, and the third time unit of the carrier having the second numerology and the first time unit of the carrier having the first numerology overlap. Specifically, the performing, by the terminal device, sending or receiving in a first time unit of a first carrier depending on whether a configured transmission direction conflicts with the transmission direction of the second time unit of the second carrier and the transmission direction of the third time unit of the second carrier includes: when the transmission direction of the second time unit of the second carrier and the transmission direction of the third time unit of the second carrier are consistent with the transmission direction of the first time unit of the first carrier, performing, by the terminal device, sending or receiving in the first time unit of the first carrier based on the configured transmission direction; and/or when the transmission direction of at least one of the second time unit of the second carrier and the third time unit of the second carrier is inconsistent with the transmission direction of the first time unit of the first carrier, skipping, by the terminal device, performing sending or receiving in the first time unit of the first carrier. The second carrier may further be extended to a plurality of second carriers. To be specific, the second carrier may be at least one second carrier. Therefore, the second time unit may be a corresponding time unit of the at least one second carrier.

At least one second component carrier may be one second component carrier or a plurality of second component carriers. When the at least one second component carrier indicates a plurality of second component carriers, different second component carriers have respective second time units. Therefore, the respective second time units are referred to as corresponding second time units of the second component carriers. For example, the at least one second component carrier includes a carrier 2, a carrier 3, and a carrier 4. A corresponding second time unit of the carrier 2, a corresponding second time unit of the carrier 3, and a corresponding second time unit of the carrier 4 may be completely aligned or incompletely aligned on time domain resources. Complete alignment indicates complete consistence of the second time units at a timing, that is, start points of the second time units are completely the same. Incomplete alignment indicates that any two of the carrier 2, the carrier 3, or the carrier 4 are not aligned; in other words, any two carriers are inconsistent at a timing, to be specific, start points of second time units of any two carriers are different. Incomplete alignment alternatively indicates that at least two of the carrier 1, the carrier 2, or the carrier 3 are not aligned; in other words, at least two carriers are inconsistent at a timing, to be specific, start points of second time units of the at least two carriers are different. Incomplete alignment alternatively indicates that all of the carrier 1, the carrier 2, or the carrier 3 are not aligned; in other words, all the carriers are inconsistent at a timing, to be specific, start points of the second time units of all the carriers are different.

It is assumed that a priority of a transmission direction type of a component carrier is relatively high. For example, the component carrier is a primary component carrier or the component carrier is dynamically configured. In this case, a transmission direction of a corresponding time unit of another component carrier may be affected by a transmission direction of a corresponding time unit of the component carrier.

For example, still referring to FIG. 2, when a transmission direction type of the time unit S13 of the CC 1 is the downlink transmission direction DL, the terminal may receive a signal or a channel in the time unit S13; receive a signal or a channel in the corresponding time unit S23 of the CC 2 (where the transmission direction DL does not conflict with the transmission direction of the time unit S13); and perform neither receiving nor sending in the corresponding time unit S33 of the CC 3 (where the transmission direction UL conflicts with the transmission direction of the time unit S13).

Similarly, when a transmission direction type of the time unit S14 of the CC 1 is the uplink transmission direction UL, the terminal may send a signal and a channel in the time unit S14, send neither signal nor channel in the corresponding time unit S24 of the CC 2, and send neither signal nor channel in the corresponding time unit S34 of the CC 3.

When the transmission direction type of the time unit S11 of the CC 1 is the flexible or variable transmission direction X, the terminal neither receives nor sends any signal or channel in the time unit S11 of the CC 1, and if the terminal neither receives nor sends any signal or channel in the corresponding time unit S21 of the CC 2 and the time unit S31 of the CC 3 (although the transmission direction types of the S21 and the S31 do not conflict), this resource "idle" manner in which neither receiving nor sending is performed may cause a waste of resources.

Embodiments of this application provide a wireless network communication method, to improve resource utilization of a terminal device in carrier aggregation.

FIG. 3 is a schematic flowchart of a wireless network communication method according to an embodiment of this application. The method in FIG. 3 may be performed by a terminal device. For example, the terminal device may be a non-full-duplex communications terminal device, for example, may be the terminal device 120 shown in FIG. 1. Certainly, the method may further be applied to a terminal device of another type, for example, a full-duplex communications device.

Step S310: Receive information indicating a transmission direction type of a first time unit of a first component carrier of the terminal device and information indicating a transmission direction type of a corresponding second time unit of at least one second component carrier of the terminal device.

The indication information herein may be explicit or implicit. The terminal device can determine a transmission direction type, for example, UL, DL, or X above, of a time unit of a component carrier based on the indication information. By way of example, and not limitation, the terminal may receive semi-statically configured signaling, for example, TDD-UL-DL-ConfigurationCommon, delivered by a base station, to separately explicitly obtain a symbol type of the first component carrier and a symbol type of the at least one second component carrier. Alternatively, the terminal may receive DCI signaling, for example, DCI 2_0, delivered by a base station, to separately explicitly obtain a symbol type of the first component carrier and a symbol type of the at least one second component carrier. Alternatively, the terminal may receive a dynamic SFI, for example, a slot format combination entry identifier, sent by a base station, to explicitly obtain slot formats of all carriers aggregated by the terminal device and types of corresponding symbol. Alternatively, the terminal device may receive measurement configuration signaling, for example, a position of a synchronization signal block in a burst (synchronization signal block-PositionInBurst, ssb-PositionsInBurst) or a to-be-measured synchronization signal block (SSB-ToMeasure), delivered by a base station, to separately implicitly obtain a symbol type of the first component carrier and a symbol type of the at least one second component carrier. Alternatively, the terminal device may receive semi-statically configured scheduling information delivered by a base station, to separately implicitly obtain a symbol type of the first component carrier and a symbol type of the at least one second component carrier. The semi-statically configured scheduling information may include a PRACH, a PDSCH, a PUSCH, a PUCCH, a CORSET, or the like.

Step S320: When the transmission direction type of the first time unit of the first component carrier of the terminal device is a flexible or variable transmission direction (X), determine, based on target information, sending and receiving manners of the terminal device in the corresponding second time unit of the at least one second component carrier.

The target information herein may include at least one of the following information: a configuration manner of the first time unit of the first component carrier of the terminal device, a configuration manner of the corresponding second time unit of the at least one second component carrier of the terminal device, and the transmission direction type of the corresponding second time unit of the at least one second component carrier.

In this embodiment of this application, when a transmission direction type of a specific component carrier is a flexible or variable transmission direction, a corresponding time unit of another component carrier is not directly limited to be idle. Instead, a factor such as a configuration manner or a transmission direction type of the component carrier is further considered to determine proper sending and receiving manners in the corresponding time unit of the another component carrier. In this way, system resources can be fully used, and system efficiency can be improved.

The first component carrier and the second component carrier, for example, the carrier 130 shown in FIG. 1, are carriers aggregated by the terminal device. In other words, the terminal device may communicate with the base station by using the first component carrier and the second component carrier.

For example, the first component carrier may be a primary component carrier corresponding to a primary cell, a component carrier corresponding to a primary cell in a secondary cell, or a component carrier corresponding to a cell having a smallest cell index in a set of component carriers aggregated by the terminal device; or a cell index of the first component carrier is smaller than a cell index of each of the at least one second component carrier. The at least one second component carrier may include one second component carrier or a plurality of second component carriers.

A time unit of a component carrier is a resource occupied by the component carrier at a moment or in a period of time in time domain. For example, the time unit may be at least one of a subframe, a slot, a mini-slot, or a symbol.

The second time unit of the at least one second component carrier and the first time unit of the first component carrier overlap. Overlap means that there is any intersection, in time domain. For example, S11, S21, and S31 in FIG. 2 overlap; or S12, S22, and S32 in FIG. 2 overlap. As described above with reference to FIG. 2, a corresponding second time unit of one second component carrier is used as an example. The second time unit and the first time unit may completely overlap, that is, time domain resources of the second time unit and the first time unit are completely the same. Alternatively, the second time unit and the first time unit may partially overlap. For example, on a time domain resource, the second time unit includes the first time unit, or the second time unit is included in the first time unit, or the second time unit and the first time unit are partially the same. The foregoing cases are all cases in which the second time unit and the first time unit overlap.

Information indicating a transmission direction type of a time unit of a component carrier may indicate the transmission direction type of the time unit of the component carrier. For example, three transmission direction types may be included: an uplink transmission direction, a downlink transmission direction, and the flexible or variable transmission direction. The transmission direction type of the time unit of the component carrier may be understood as a transmission status of the time unit of the component carrier for the terminal device. For example, when the transmission direction type of the time unit of the component carrier is the uplink transmission direction, the terminal device may perform sending in the time unit; when the transmission direction type of the time unit of the component carrier is the downlink transmission direction, the terminal device may perform receiving in the time unit; or when the transmission direction type of the time unit is the flexible or variable transmission direction, the terminal device may perform neither receiving nor sending in the time unit.

It should be understood that flexible or variable may also be referred to as unknown, an unknown status, a flexible status, flexible, direction variable (configurable), or the like.

A configuration manner of a time unit of a component carrier is a manner used when the base station configures the time unit of the component carrier. For example, the manner may be semi-static configuration or dynamic configuration. The semi-static configuration may include cell-common slot format configuration, cell-specific slot format configuration, terminal-dedicated (UE dedicated) slot format configuration, or measurement configuration. The dynamic configuration may include slot format indicator SFI configuration, downlink control information DCI configuration, or the like. The measurement configuration may include radio resource control (RRC) configuration, and the RRC configuration is used for at least one of downlink measurement, uplink measurement, downlink data transmission, or uplink data transmission for radio resource management (RRM). The downlink measurement includes synchronization signal measurement or channel measurement, and the uplink measurement includes SRS measurement. The synchronization signal measurement is measurement based on a synchronization signal or a synchronization signal block, and the channel measurement is measurement based on a reference signal (such as a CSI-RS or a CRS). The radio resource control (RRC) configuration may be configuration performed by using UE-dedicated (dedicated) RRC signaling, and the UE-dedicated RRC signaling includes RRC signaling used to indicate a downlink measurement signal or an uplink measurement signal. The downlink measurement signal includes the synchronization signal (synchronization signal) or the reference signal (such as a CSI-RS or a CRS) used for channel measurement; and the uplink measurement signal includes a sounding reference signal (SRS) or a random access channel (PRACH). The UE-dedicated RRC signaling may further include at least one of detection on a PUCCH, a PUSCH, a PDSCH, or a CORSET (control resource set). The RRC signaling may be a broadcast message (for example, a broadcast message sent by using a master information block (MIB) or a system information block (SIB); or for another example, a broadcast message sent by using remaining system information (RMSI) or other system information (OSI)), and the RRC signaling may alternatively be a UE-dedicated control message.

Therefore, if different configuration manners are used in a specific cell and another cell, whether the configuration manner used in the specific cell or the configuration manner used in the another cell is followed further needs to be specified.

In an embodiment of this application, it may be considered that a priority of the semi-static configuration is lower than a priority of the dynamic configuration. That is, for a same object or associated objects (for example, corresponding overlapping time units of different component carriers), if a result of the semi-static configuration is inconsistent with a result of the dynamic configuration, the result of the dynamic configuration is used. The semi-static configuration includes at least one of cell-common slot format configuration, cell-specific slot format configuration, terminal-dedicated slot format configuration, measurement configuration, or semi-statically configured scheduling information; and the dynamic configuration includes at least one of slot format indicator SFI configuration or downlink control information DCI configuration.

The transmission direction type that is of the corresponding second time unit of the at least one second component carrier and that is included in the target information may have a plurality of forms. For example, transmission direction types of time units of all second component carriers in the at least one second component carrier are the same, and are all uplink transmission directions, downlink transmission directions, or unknown transmission directions. For another example, transmission direction types of time units of all second component carriers in the at least one second component carrier are different, or transmission direction types of time units of only some second component carriers are the same. For example, there are a plurality of combinations of DL, UL, and X.

The time unit of the first component carrier may be semi-statically configured, or may be dynamically configured, the semi-static configuration may be any one of the configuration mentioned earlier, and the dynamic configuration may be any one of the configuration mentioned earlier.

The configuration manner of the time unit of the at least one second component carrier may have a plurality of forms. For example, when the at least one second component carrier includes only one second component carrier, the time unit of the second component carrier may be semi-statically configured or dynamically configured. When the at least one second component carrier includes a plurality of second component carriers, configuration manners of time units of the plurality of second component carriers may be the same or may be different. For example, all the configuration manners are the semi-static configuration or the dynamic configuration, or configuration manners of time units of some second component carriers are the semi-static configuration, or configuration manners of time units of some second component carriers are the dynamic configuration. A specific configuration manner, in the semi-static configuration or the dynamic configuration, of the time unit of the component carrier is not limited in this application.

The sending and receiving manners described herein mainly include three manners for the terminal device: receiving, sending, and neither receiving nor sending (this may also be referred to as a case in which a corresponding time unit is idle).

Sending data by the terminal device includes sending one or more of a PUSCH, a PUCCH, an SRS, or a PRACH; and receiving data by the terminal device includes receiving one or more of a PDSCH, a PDCCH, or a PHICH. This is not limited in this embodiment of this application.

The following describes, with reference to a specific example, how the terminal device determines the sending and receiving manners in the second time unit of the second component carrier based on the target information. It should be noted that these examples are merely examples, and are not intended to limit the scope of this application.

For example, when the transmission direction type of the corresponding second time unit of the at least one second component carrier includes the uplink transmission direction UL and the downlink transmission direction DL (that is, a conflict occurs), it is determined that the terminal device performs neither receiving nor sending in the second time unit of the at least one second component carrier.

Because the transmission direction types of the corresponding time units of the second component carriers conflict, and the terminal device cannot simultaneously perform sending and receiving, the terminal device sets the corresponding time units of all the second component carriers to be idle, and performs neither receiving nor sending. In this way, a working fault of the terminal device can be reduced.

Alternatively, for example, when the transmission direction type of the corresponding second time unit of the at least one second component carrier is the flexible or variable transmission direction, it is determined that the terminal device performs neither receiving nor sending in the second time unit of the at least one second component carrier.

Because the transmission direction types of the corresponding time units of all the second component carriers are flexible or variable transmission directions, that is, it is not clear whether the terminal device needs to perform receiving or sending, the terminal device sets the corresponding time units of all the second component carriers to be idle, and performs neither receiving nor sending. In this way, a working fault of the terminal device can be reduced.

For another example, when the transmission direction type of the corresponding second time unit of the at least one second component carrier does not include both the uplink transmission direction and the downlink transmission direction (that is, a conflict does not occur), the sending and receiving manners of the terminal device in the second time unit of the at least one second component carrier are determined. When the transmission direction type of the corresponding second time unit of the at least one second component carrier does not include both the uplink transmission direction and the downlink transmission direction, the terminal device sends or receives data based on a configured transmission direction. If the transmission direction type of the corresponding second time unit of the at least one second component carrier is the flexible or variable transmission direction, the terminal device performs neither sending nor receiving, but only performs monitoring. In other words, the second time unit is idle. That is, when the transmission direction type of the corresponding second time unit of the at least one second component carrier does not include both the uplink transmission direction and the downlink transmission direction (that is, a conflict does not occur) and is not all the flexible or variable transmission direction, the terminal device performs sending or receiving in the second time unit of the at least one second component carrier.

Because the transmission direction types of the corresponding time units of the second component carriers do not conflict, some or all of the component carriers may be used for sending and receiving, so that the system resources are fully used, and improving the system efficiency.

For example, it is assumed that the first time unit of the first component carrier is semi-statically configured, and the transmission direction type of the second time unit of the at least one second component carrier includes the uplink transmission direction. If the corresponding second time unit of the at least one second component carrier is semi-statically configured and/or dynamically configured, it is determined that the terminal device performs sending in the second time unit of the at least one second component carrier.

Alternatively, for example, it is assumed that the first time unit of the first component carrier is semi-statically configured, and the transmission direction type of the second time unit of the at least one second component carrier includes the downlink transmission direction. If the corresponding second time unit of the at least one second component carrier is semi-statically configured and/or dynamically configured, it is determined that the terminal device performs receiving in the second time unit of the at least one second component carrier.

For another example, it is assumed that the first time unit of the first component carrier is dynamically configured, and the transmission direction type of the first time unit of the first component carrier is the uplink transmission direction. If the corresponding second time unit of the at least one second component carrier is semi-statically configured and/or dynamically configured, it is determined that the terminal device performs sending in the second time unit of the at least one second component carrier.

Alternatively, for example, it is assumed that the first time unit of the first component carrier is dynamically configured, and the transmission direction type of the first time unit of the first component carrier is the downlink transmission direction. If the corresponding second time unit of the at least one second component carrier is semi-statically configured and/or dynamically configured, it is determined that the terminal device performs receiving in the second time unit of the at least one second component carrier.

In this way, priority factors of the dynamic configuration and the semi-static configuration can be fully considered, thereby reducing the working fault of the terminal device.

In still another possible implementation, if the transmission direction type of the corresponding second time unit of the at least one second component carrier has inconsistent transmission direction types. For example, transmission direction types of corresponding second time units of some second component carriers in the at least one second component carrier are uplink transmission directions, and transmission direction types of corresponding second time units of the other second component carriers are flexible or variable transmission directions, the terminal device may perform sending in the corresponding second time units of the some second component carriers in the at least one second component carrier, and does not perform sending in the corresponding second time units of the other second component carriers in the at least one second component carrier or sets the corresponding second time units of the other second component carriers in the at least one second component carrier to be idle.

For example, if the transmission direction type of the first time unit of the first component carrier is the flexible or variable transmission direction type, and the transmission direction type of the corresponding second time unit of the at least one second component carrier includes the flexible or variable transmission direction and the downlink transmission direction, for example, if a transmission direction type of a first time unit #1 of a second component carrier 1#is the flexible or variable transmission direction, and transmission direction types of corresponding second time units of a second component carrier #2 and a second component carrier #3 are downlink transmission directions, the terminal device receives data.

In still another possible implementation, if the transmission direction type of the corresponding second time unit of the at least one second component carrier has inconsistent transmission direction types, for example, transmission direction types of corresponding second time units of some second component carriers in the at least one second component carrier are downlink transmission directions, and transmission direction types of corresponding second time units of the other second component carriers are flexible or variable transmission directions, the terminal device may perform receiving in the corresponding second time units of the some second component carriers in the at least one second component carrier, and does not perform receiving in the corresponding second time units of the other second component carriers in the at least one second component carrier or sets the corresponding second time units of the other second component carriers in the at least one second component carrier to be idle.

For example, if the transmission direction type of the first time unit of the first component carrier is the flexible or variable transmission direction, and the transmission direction type of the corresponding second time unit of the at least one second component carrier includes the flexible or variable transmission direction and the uplink transmission direction, for example, if a transmission direction type of a first time unit #1 of a second component carrier 1#is the flexible or variable transmission direction, and transmission direction types of corresponding second time units of a second component carrier #2 and a second component carrier #3 are uplink transmission directions, the terminal device sends data. In this way, the system resources can be fully used, and the system efficiency can be improved.

The following describes some specific non-limiting examples in the embodiments of this application in more detail with reference to FIG. 4 to FIG. 7. In FIG. 4 to FIG. 7, an example in which a symbol is used as a time unit is used for description. However, another type of time unit may alternatively be used in the embodiments of this application. In addition, in FIG. 4 to FIG. 7, a plurality of component carriers are depicted in a manner in which corresponding time units are aligned with each other. However, as described above, a case in which time units of component carriers partially overlap may further be used in the embodiments of this application.

Figure 4:
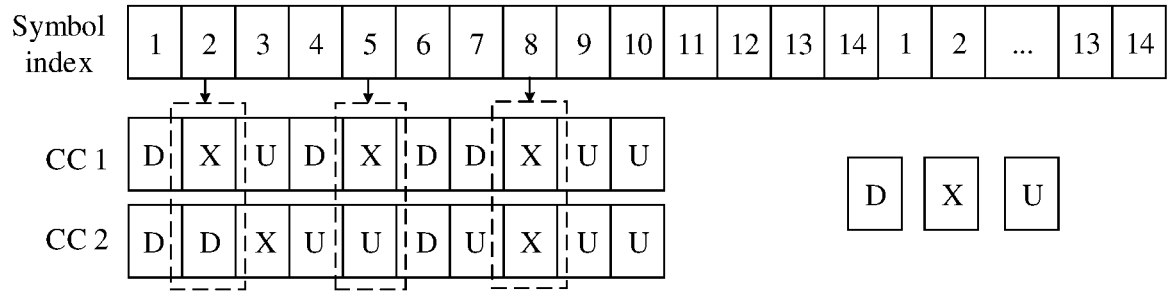
FIG. 4 is a schematic diagram of a communication resource according to an embodiment of this application.

FIG. 4 is a schematic diagram of a communication resource according to an embodiment of this application.

As shown in FIG. 4, carrier aggregation is performed on component carriers CC 1 and CC 2. For ease of description, in this embodiment of this application, the component carrier CC 1 is used as an example of the first component carrier, and the CC 2 is used as an example of the second component carrier.

In FIG. 4, transmission statuses of some symbols of the component carriers are selected as an example for description. The first line in FIG. 4 depicts an index or a serial number of each symbol. As shown in FIG. 4, in a symbol 1 to a symbol 10 of the CC 1, the symbol 2, the symbol 5, and the symbol 8 are all flexible symbols X. The following provides example descriptions based on different cases.

Case 1: For the Symbol 2

The symbol 2 of the CC 1 is the flexible symbol X. It may be understood that a transmission direction type of the symbol 2 of the CC 1 is an unknown status or a flexible status. In this case, a terminal device neither receives data nor sends data on the symbol 2. A symbol 2 of the CC 2 is a downlink symbol D. It may be understood that a transmission direction type of the symbol 2 of the CC 2 is a downlink transmission direction. In this case, whether the terminal device can receive data on the symbol 2 of the CC 2 needs to be determined based on configuration manners of the symbol 2 of the CC 1 and the symbol 2 of the CC 2.

For example, if the symbol 2 of the CC 1 is semi-statically configured as the flexible symbol X, and the symbol 2 of the CC 2 is configured as the downlink symbol D through one of cell-common slot format configuration, cell-specific slot format configuration, terminal-dedicated slot format configuration, measurement configuration, semi-statically configured scheduling information, DCI configuration, or SFI configuration, the terminal device may receive a signal on the symbol 2 of the CC 2. The semi-static configuration includes at least one of the cell-common slot format configuration, the cell-specific slot format configuration, the terminal-dedicated slot format configuration, the measurement configuration, or the semi-statically configured scheduling information.

For another example, if the symbol 2 of the CC 1 is configured as the flexible symbol X through dynamic configuration such as SFI configuration or DCI configuration, and the symbol 2 of the CC 2 is configured as the downlink symbol D through one of the DCI configuration or the SFI configuration, the terminal device may receive data on the symbol 2 of the CC 2.

For still another example, if the symbol 2 of the CC 1 is dynamically configured as the flexible symbol X, and the symbol 2 of the CC 2 is semi-statically configured as the downlink symbol D, the terminal device may neither receive data nor send data on the symbol 2 of the CC 2; in other words, the symbol 2 of the CC 2 is idle.

Case 2: For the Symbol 5

The symbol 5 of the CC 1 is the flexible symbol X. It may be understood that a transmission direction type of the symbol 5 of the CC 1 is a flexible status. In this case, a terminal device neither receives data nor sends data on the symbol 5. A symbol 5 of the CC 2 is an uplink symbol U. It may be understood that a transmission direction type of the symbol 5 of the CC 2 is an uplink transmission direction. In this case, whether the terminal device can send data on the symbol 5 of the CC 2 needs to be determined based on configuration manners of the symbol 5 of the CC 1 and the symbol 5 of the CC 2.

For example, if the symbol 5 of the CC 1 is semi-statically configured as the flexible symbol X, and the symbol 5 of the CC 2 is configured as the uplink symbol U through one of cell-common slot format configuration, cell-specific slot format configuration, terminal-dedicated slot format configuration, measurement configuration, semi-statically configured scheduling information, DCI configuration, or SFI configuration, the terminal device may send a signal on the symbol 5 of the CC 2. The semi-static configuration includes at least one of the cell-common slot format configuration, the cell-specific slot format configuration, the terminal-dedicated slot format configuration, the measurement configuration, or the semi-statically configured scheduling information.

For another example, if the symbol 5 of the CC 1 is dynamically configured as the flexible symbol X, and the symbol 5 of the CC 2 is dynamically configured as the uplink symbol U, the terminal device may send data on the symbol 5 of the CC 2.

For still another example, if the symbol 5 of the CC 1 is dynamically configured as the flexible symbol X, and the symbol 5 of the CC 2 is semi-statically configured as the uplink symbol U, the terminal device may neither receive data nor send data on the symbol 5 of the CC 2.

Case 3: For the Symbol 8

The symbol 8 of the CC 1 is the flexible symbol X. It may be understood that a transmission direction type of the symbol 8 of the CC 1 is a flexible status. In this case, a terminal device neither receives data nor sends data on the symbol 8. A symbol 8 of the CC 2 is also the flexible symbol X, and the terminal device neither receives data nor sends data on the symbol 8 of the CC 2.

In the foregoing embodiment, the terminal device aggregates two component carriers, and the terminal device may further aggregate more than two component carriers. The following provides detailed descriptions by using an example in which the terminal device aggregates three component carriers. It should be understood that the wireless network communication method in the embodiments of this application is further applicable to a case in which the terminal device aggregates more than three carriers.

Figure 5:
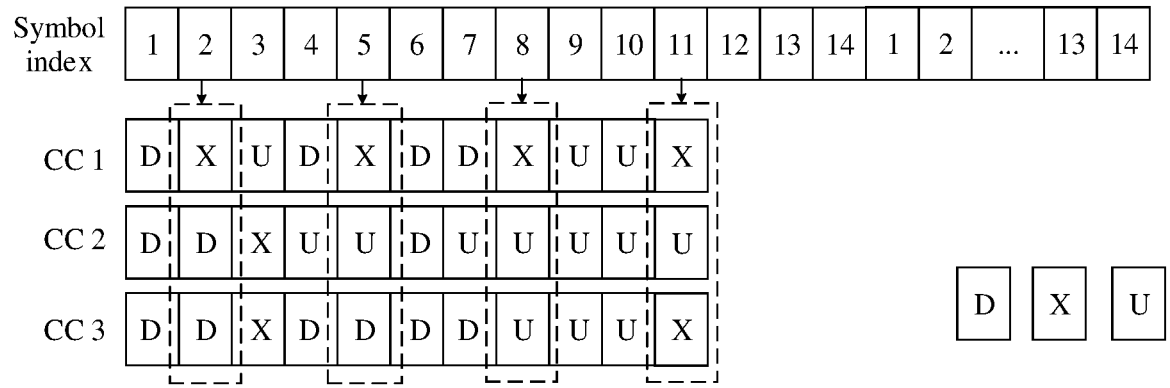
FIG. 5 is a schematic diagram of a communication resource according to another embodiment of this application.

FIG. 5 is a schematic diagram of a communication resource according to another embodiment of this application.

As shown in FIG. 5, carrier aggregation is performed on component carriers CC 1, CC 2, and CC 3. For ease of description, in this embodiment of this application, the component carrier CC 1 is used as an example of the first component carrier, and the CC 2 and the CC 3 are used as two examples of the second component carrier.

In FIG. 5, transmission direction types of some symbols of the component carriers are selected as an example for description. The first line in FIG. 5 depicts an index or a serial number of each symbol. As shown in FIG. 5, in a symbol 1 to a symbol 14 of the CC 1, the symbol 2, the symbol 5, the symbol 8, and the symbol 11 are all flexible symbols X. The following provides example descriptions based on different cases. The foregoing understanding of the transmission direction type of the symbol is also applicable to this embodiment. For brevity, details are not described herein again. For content that is not described in detail, refer to the foregoing related descriptions of the case in which the terminal aggregates two component carriers.

Case 1: For the Symbol 2

If the symbol 2 of the CC 1 is the flexible symbol X, a terminal device performs neither receiving nor sending on the symbol 2. A symbol 2 of each of the CC 2 and the CC 3 is a downlink symbol D. In this case, whether the terminal device can receive data on the symbol 2 of the CC 2 or the CC 3 needs to be determined based on configuration manners of the symbol 2 of the CC 1, the symbol 2 of the CC 2, and the symbol 2 of the CC 3.

If the symbol 2 of the CC 1 is semi-statically configured as the flexible symbol X, the symbol 2 of the CC 2/CC 3 is configured as the downlink symbol D through one or more of cell-common slot format configuration/cell-specific slot format configuration/terminal-dedicated slot format configuration/measurement configuration/semi-statically configured scheduling information/DCI configuration/SFI configuration. In this case, the terminal device may receive data on the symbol 2 of the CC 2 and/or the symbol 2 of the CC 3. The semi-static configuration includes at least one of the cell-common slot format configuration, the cell-specific slot format configuration, the terminal-dedicated slot format configuration, the measurement configuration, or the semi-statically configured scheduling information.

For example, if the symbol 2 of the CC 1 is semi-statically configured as the flexible symbol X, the symbol 2 of the CC 2 may be configured as the downlink symbol D through one of the cell-common slot format configuration, the cell-specific slot format configuration, the terminal-dedicated slot format configuration, the measurement configuration, the semi-statically configured scheduling information, the DCI configuration, or the SFI configuration, and the symbol 2 of the CC 3 may be configured as the downlink symbol D through one of the cell-common slot format configuration, the cell-specific slot format configuration, the terminal-dedicated slot format configuration, the measurement configuration, the semi-statically configured scheduling information, the DCI configuration, or the SFI configuration, the terminal device may receive data on the symbol 2 of the CC 2 and/or the symbol 2 of the CC 3.

For another example, if the symbol 2 of the CC 1 is semi-statically configured as the flexible symbol X, the symbol 2 of the CC 2 may be configured as the downlink symbol D through one of the cell-common slot format configuration, the cell-specific slot format configuration, the terminal-dedicated slot format configuration, the measurement configuration, the semi-statically configured scheduling information, the DCI configuration, or the SFI configuration, and the symbol 2 of the CC 3 may be configured as the flexible symbol X through one of the cell-common slot format configuration, the cell-specific slot format configuration, the terminal-dedicated slot format configuration, or the SFI configuration, the terminal device may receive data on the symbol 2 of the CC 2 and/or the symbol 2 of the CC 3.

In other words, when the symbol 2 of the CC 1 is semi-statically configured as the flexible symbol X, the terminal device can receive data on the symbol 2 of the CC 2 and/or the symbol 2 of the CC 3 regardless of whether the symbol 2 of the CC 2 and the symbol 2 of the CC 3 are semi-statically configured or dynamically configured.

If the symbol 2 of the CC 1 is dynamically configured as the flexible symbol X, and the symbol 2 of the CC 2 and the symbol 2 of the CC 3 are dynamically configured as downlink symbols D, the terminal device may receive data on the symbol 2 of the CC 2 and/or the symbol 2 of the CC 3.

For example, the symbol 2 of the CC 1 may be configured as the flexible symbol X through the SFI configuration or DCI configuration, the symbol 2 of the CC 2 may be configured as the downlink symbol D through the SFI configuration or DCI configuration, and the symbol 2 of the CC 3 may be configured as the downlink symbol D through the SFI configuration or DCI configuration. In this case, the terminal device may receive data on the symbol 2 of the CC 2 and/or the symbol 2 of the CC 3.

In other words, when the symbol 2 of each of the CC 1, the CC 2, and the CC 3 is dynamically configured, the terminal may receive data on the symbol 2 of the CC 2 and/or the symbol 2 of the CC 3.

If the symbol 2 of the CC 1 is dynamically configured as the flexible symbol X, and the symbol 2 of the CC 2 and/or the symbol 2 of the CC 3 are/is semi-statically configured as downlink symbols D/the downlink symbol D, the terminal device may neither receive data nor send data on the symbol 2 of the CC 2 and the symbol 2 of the CC 3.

Optionally, the terminal may alternatively first determine, based on configuration manners of a same symbol of the first component carrier and the at least one second component carrier, the sending and receiving manners of the terminal on the symbol of the at least one second component carrier.

For example, if all of the symbol 2 of the CC 1, the symbol 2 of the CC 2, and the symbol 2 of the CC 3 are dynamically configured, whether the terminal can send and receive data on the CC 2 and the CC 3 may further be determined based on transmission direction types of the symbol 2 of the CC 2 and the symbol 2 of the CC 3. In FIG. 5, both the symbol 2 of the CC 2 and the symbol 2 of the CC 3 are downlink symbols, and the terminal device may receive data on the symbol 2 of the CC 2 and/or the symbol 2 of the CC 3.

For another example, if the symbol 2 of the CC 1 is semi-statically configured, and the symbol 2 of the CC 2 and the symbol 2 of the CC 3 are semi-statically configured or dynamically configured, whether the terminal can send and receive data on the CC 2 and the CC 3 may further be determined based on transmission direction types of the symbol 2 of the CC 2 and the symbol 2 of the CC 3. In FIG. 5, the symbol 2 of the CC 2 and the symbol 2 of the CC 3 have different transmission direction types, and are separately an uplink symbol U and the downlink symbol D. The terminal device neither receives data nor sends data on the symbol 2 of the CC 2 and the symbol 2 of the CC 3.

It should be noted that in this embodiment of this application, whether the terminal first determines sending and receiving manners of the terminal on a symbol based on a transmission direction type of the symbol or first determines sending and receiving manners of the terminal on a symbol based on a configuration manner of the symbol is not limited in this embodiment of this application.

This method is further applicable to a case in which the terminal device aggregates more than three component carriers.

Case 2: For the Symbol 5

If the symbol 5 of the CC 1 is the flexible symbol X, a terminal performs neither receiving nor sending on the symbol 5. A symbol 5 of the CC 2 is an uplink symbol U, and a symbol 5 of the CC 3 is a downlink symbol D. In this case, the terminal device performs neither receiving nor sending on the symbol 5 of the CC 2 and the symbol 5 of the CC 3.

In other words, when transmission direction types of a symbol of the component carriers aggregated by the terminal include the uplink symbol and the downlink symbol, the terminal device neither receives data nor sends data on the symbol.

For another example, the symbol 5 of the CC 1 is the flexible symbol X, the symbol 5 of the CC 2 is the uplink symbol U, the symbol 5 of the CC 3 is the downlink symbol D, and a symbol 5 of a CC 4 is the flexible symbol X. In this case, the terminal device performs neither receiving nor sending on the symbol 5 of the CC 2, the symbol 5 of the CC 3, and the symbol 5 of the CC 4.

Case 3: For the Symbol 8

If the symbol 8 of the CC 1 is the flexible symbol X, a terminal performs neither receiving nor sending on the symbol 8. A symbol 8 on each of the CC 2 and the CC 3 is an uplink symbol U. In this case, whether the terminal device can perform sending on the symbol 8 of the CC 2 or the CC 3 needs to be determined based on configuration manners of the symbol 8 of the CC 1, the symbol 8 of the CC 2, and the symbol 8 of the CC 3.

A determining principle for the determining, based on configuration manners of the symbol 8 of the CC 1, the symbol 8 of the CC 2, and the symbol 8 of the CC 3, whether the terminal device can perform sending on the symbol 8 is similar to that of the method in Case 1, and only example descriptions are provided herein.

For example, the symbol 8 of the CC 1 is configured as the flexible symbol X by through SFI configuration, and the symbol 8 of the CC 2 is configured as the uplink symbol U through cell-common slot format configuration, cell-specific slot format configuration, terminal-dedicated slot format configuration, measurement configuration, or semi-statically configured scheduling information, the symbol 8 of the CC 3 is configured as the uplink symbol U through DCI configuration or the SFI configuration. In this case, the terminal device does not send data on the symbol 8 of the CC 8 and the symbol 2 of the CC 3.

For another example, the symbol 8 of the CC 1 is configured as the flexible symbol X through SFI configuration, the symbol 8 of the CC 2 is configured as the uplink symbol U through DCI configuration or the SFI configuration, and the symbol 8 of the CC 3 is configured as the uplink symbol U through the DCI configuration or SFI configuration. In this case, the terminal device may send data on the symbol 8 of the CC 2 and/or the symbol 8 of the CC 3.

For still another example, if the symbol 8 of the CC 1 is semi-statically configured as the flexible symbol X, the symbol 8 of the CC 2 is configured as the uplink symbol U through one of cell-common slot format configuration, cell-specific slot format configuration, terminal-dedicated slot format configuration, measurement configuration, semi-statically configured scheduling information, DCI configuration, or SFI configuration, and the symbol 8 of the CC 3 is configured as the uplink symbol U through the cell-common slot format configuration, the cell-specific slot format configuration, the terminal-dedicated slot format configuration, the measurement configuration, the semi-statically configured scheduling information, the DCI configuration, or the SFI configuration, the terminal device may send data on the symbol 8 of the CC 2 and/or the symbol 8 of the CC 3.

Case 4: For the Symbol 11

If the symbol 11 of the CC 1 is the flexible symbol X, a terminal performs neither receiving nor sending on the symbol 11. A symbol 11 of the CC 2 is an uplink symbol U, and a symbol 11 of the CC 3 is the flexible symbol X. In this case, whether the terminal device can send data on the symbol 11 of the CC 2 needs to be determined based on configuration manners of the symbol 11 of the CC 1 and the symbol 11 of the CC 2.

A method for determining, based on the configuration manners of the symbol 11 of the CC 1 and the symbol 11 of the CC 2, whether the terminal device can send data on the symbol 11 of the CC 2 is the same as the method for determining, in FIG. 5, whether the terminal can transmit data on the symbol 2 or the symbol 5 of each of the CC 1 and the CC 2. For details, refer to the foregoing descriptions.

Further, the terminal may further aggregate four component carriers, and transmission direction type combinations of a same symbol of the component carriers have several cases different from those foregoing cases in which the terminal aggregates a maximum of three component carriers. The following uses FIG. 6 as an example for description.

Figure 6:
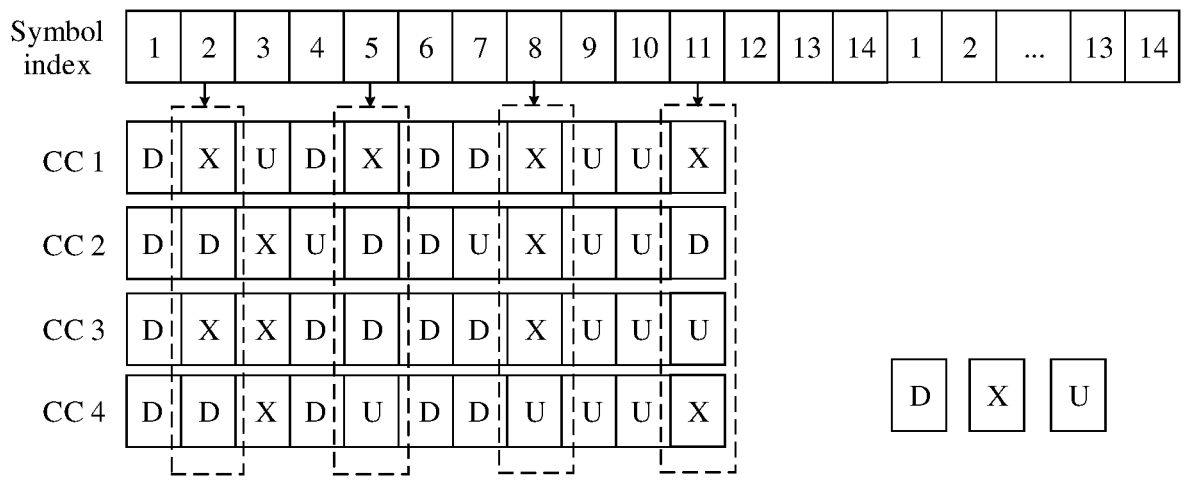
FIG. 6 is a schematic diagram of a communication resource according to still another embodiment of this application.

FIG. 6 is a schematic diagram of a communication resource according to another embodiment of this application.

As shown in FIG. 6, carrier aggregation is performed on component carriers CC 1, CC 2, CC 3, and CC 4. For ease of description, in this embodiment of this application, the component carrier CC 1 is used as an example of the first component carrier, and the CC 2, the CC 3, and the CC 4 are used as three examples of the second component carrier.

In FIG. 6, transmission direction types of some symbols of the component carriers are selected as an example for description. The first line in FIG. 6 depicts an index or a serial number of each symbol. As shown in FIG. 5, in a symbol 1 to a symbol 14 of the CC 1, the symbol 2, the symbol 5, the symbol 8, and the symbol 11 are all flexible symbols X. The following provides example descriptions based on different cases.

Case 1: For the Symbol 2

If the symbol 2 of the CC 1 is the flexible symbol X, a terminal performs neither receiving nor sending on the symbol 2. A symbol 2 of the CC 2 is a downlink symbol D, a symbol 2 of the CC 3 is a flexible symbol X, and a symbol 2 of the CC 4 is a downlink symbol. In this case, whether the terminal device can receive data on the symbol 2 of the CC 2 and/or the symbol 2 of the CC 4 needs to be determined based on configuration manners of the symbol 2 of the CC 1, the symbol 2 of the CC 2, and the symbol 2 of the CC 4.

In other words, when a symbol of the at least one second component carrier does not include both an uplink symbol and a downlink symbol, for example, includes only an uplink symbol, or includes only a downlink symbol, or includes an uplink symbol and a flexible symbol, or includes a downlink symbol and a flexible symbol, the terminal may further determine a configuration manner of the symbol, of the component carrier, that is the uplink symbol or the downlink symbol, to determine whether data can be transmitted on the uplink symbol or the downlink symbol.

In this case, a specific method for performing, by the terminal, determining based on the configuration manners of the symbol 2 of the CC 1, the symbol 2 of the CC 2, and the symbol 2 of the CC 4 is the same as the method for performing, by the terminal, determining based on the configuration manners of the symbol 2 of the CC 1, the symbol 2 of the CC 2, and the symbol 2 of the CC 3 in FIG. 5. Details are not described herein again.

Case 2: For the Symbol 5

In this case, as shown in FIG. 6, in the at least one second component carrier, a symbol 5 of the CC 2 and a symbol 5 of the CC 3 are downlink symbols, and a symbol 5 of the CC 4 is an uplink symbol. In this case, the terminal device neither receives data nor sends data on the symbol 5 of the at least one second component carrier.

Case 3: For the Symbol 8

In a symbol 8 of the at least one second component carrier, only a symbol 8 of the CC 4 is an uplink symbol. In this case, a method for determining, by the terminal, the configuration manner of the symbol is the same as the method for performing, by the terminal, determining based on the configuration manners of the symbols of the two component carriers in FIG. 5. Details are not described herein again.

Case 4: For the Symbol 11

A symbol 11 of the at least one second component carrier includes symbols having three transmission direction types. The terminal device may neither receive data nor send data on the symbol 11 of the at least one second component carrier. In the foregoing embodiment, the wireless network communication method in this embodiment of this application is used to determine, when a symbol of one component carrier is a flexible symbol, whether the terminal device can receive and send data on symbols of all component carriers other than the component carrier. The wireless network communication method in this embodiment of this application may further be used to determine, when symbols of two component carriers are both flexible symbols, whether the terminal device can receive and send data on symbols of all component carriers other than the two component carriers. Alternatively, by analogy, the method may be used in a scenario in which symbols of more component carriers are all flexible symbols.

FIG. 7 is a schematic diagram of a communication resource according to another embodiment of this application.

As shown in FIG. 7, carrier aggregation is performed on component carriers CC 1, CC 2, CC 3, and CC 4, and the component carrier CC 1 is a component carrier corresponding to a specific cell, for example, a primary component carrier corresponding to a primary cell, or a component carrier corresponding to a primary cell in a secondary cell, or a component carrier corresponding to a cell having a smallest cell index in a set of all component carriers (the CC 1 to the CC 4) aggregated by a terminal device.

In FIG. 7, transmission statuses of some symbols of the component carriers are selected as an example for description. As shown in FIG. 7, in a symbol 1 to a symbol 10 of the CC 1, the symbol 2, the symbol 5, and the symbol 8 are all flexible symbols X, and the CC 2 is used as a reference carrier. The wireless network communication method shown in FIG. 4 to FIG. 6 is further applicable to a carrier set including the CC 2, the CC 3, and the CC 4 (that is, the CC 1 is used as an example of the first component carrier, and the CC 2 to the CC 4 are used as examples of the second component carrier).

However, for the symbol 2, a symbol 2 of the CC 2 is also the flexible symbol X. In this case, the sending/receiving determining manner in the embodiments of this application may further be used for the CC 2, the CC 3, and the CC 4. For example, assuming that a cell index of the CC 2 is smaller than cell indexes of the CC 3 and the CC 4, the CC 2 may be used as an example of the first component carrier, and the CC 3 and the CC 4 may be used as examples of the second component carrier.

Whether the terminal can receive and send data on a symbol 2 of the CC 3 and a symbol 2 of the CC 4 may be determined based on transmission direction types of the symbol 2 of the CC 3 and the symbol 2 of the CC 4 and/or configuration manners of the symbol 2 of the CC 3 and the symbol 2 of the CC 4.

For example, the symbol 2 of the CC 2 is the flexible symbol, and the transmission direction types of the symbol 2 of the CC 3 and the symbol 2 of the CC 4 are different. In this case, the terminal device sets the symbol 2 of the CC 3 and the symbol 2 of the CC 4 to be idle.

For example, the symbol 2 of the CC 2 is the flexible symbol, and the symbol 2 of the CC 3 and the symbol 2 of the CC 4 are both uplink symbols or downlink symbols. In this case, the terminal device further determines, based on configuration manners of the symbol 2 of the CC 2, the symbol 2 of the CC 3, and the symbol 2 of the CC 4, whether sending and receiving can be performed on the CC 3 and/or the CC 4. A case in which the determining is performed based on the configuration manners herein is the same as a corresponding case in the methods shown in FIG. 4 and FIG. 5. For brevity, details are not described herein again.

For example, the symbol 2 of the CC 1 is the flexible symbol X, the symbol 2 of the CC 2 is the uplink symbol or the downlink symbol. In this case, the terminal performs neither receiving nor sending on the symbol 2 of the CC 3 and the symbol 2 of the CC 4.

Further, if the symbol 2 of the CC 2 is the flexible symbol, and a cell index of the CC 3 is less than a cell index of the CC 4, the CC 3 may alternatively be used as the first component carrier, and the CC 4 may be used as the second component carrier, the wireless network communication method shown in FIG. 4 to FIG. 6 is further applicable to a carrier set including the CC 3 and the CC 4.

An embodiment of this application further provides another wireless network communication method. As shown in FIG. 8, the method includes step S810 and step S820.

Step S810: A terminal device receives information indicating a transmission direction type of a first time unit of a first component carrier and information indicating a transmission direction type of a corresponding second time unit of at least one second component carrier.

Step S820: When the first time unit of the first component carrier of the terminal device is semi-statically configured, determine, based on target information, sending and receiving manners of the terminal device in the corresponding second time unit of the at least one second component carrier.

The target information includes at least one of the following information: the transmission direction type of the first time unit of the first component carrier of the terminal device, the transmission direction type of the corresponding second time unit of the at least one second component carrier of the terminal device, and a configuration manner of the transmission direction type of the corresponding second time unit of the at least one second component carrier.

The corresponding second time unit of the at least one second component carrier and the first time unit of the first component carrier overlap.

The time unit is at least one of a subframe, a slot, a mini-slot, or a symbol.

The first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

In a possible implementation, when the transmission direction type of the corresponding second time unit of the at least one second component carrier includes an uplink transmission direction and a downlink transmission direction, the terminal device performs neither sending nor receiving in the corresponding second time unit of the at least one second component carrier.

In a possible implementation, when the transmission direction type of the corresponding second time unit of the at least one second component carrier is a flexible or variable transmission direction, the terminal device performs neither sending nor receiving in the corresponding second time unit of the at least one second component carrier.

In a possible implementation, when the first time unit of the first component carrier is semi-statically configured as the downlink transmission direction, and a transmission direction of the corresponding second time unit of the at least one second component carrier includes (or only includes) an unknown transmission direction and the downlink transmission direction, sending and receiving manners of the terminal device in the first time unit of the first component carrier and the second time unit of the at least one second component carrier are determined based on a configuration manner of the first time unit of the first component carrier and the configuration manner of the second time unit of the at least one second component carrier. The determining sending and receiving manners of the terminal device in the corresponding second time unit of the at least one second component carrier is determining that the terminal device receives data in the corresponding time unit of the at least one second component carrier; and the corresponding second time unit of the at least one second component carrier and the first time unit of the first component carrier overlap. A specific example is as follows:

For example, when the transmission direction type of the first time unit of the first component carrier is semi-statically configured as the downlink transmission direction, the transmission direction type of the second time unit of the second component carrier is the flexible transmission direction, and transmission direction types of a third time unit of a third component carrier and a fourth time unit of a fourth component carrier are semi-statically or dynamically configured as downlink transmission directions, the terminal device performs receiving in the first time unit of the first component carrier, performs neither sending nor receiving in the second time unit of the second component carrier, and performs receiving in the third time unit of the third component carrier and the fourth time unit of the fourth component carrier.

It should be noted that both the third component carrier and the fourth component carrier are carriers in the at least one second component carrier, and the third time unit and the fourth time unit are corresponding time units of the at least one second component carrier. Herein, for ease of understanding, other second component carriers are referred to as the third component carrier and the fourth component carrier for example.

For another example, when the transmission direction type of the first time unit of the first component carrier is semi-statically configured as the downlink transmission direction, the transmission direction type of the second time unit of the second component carrier is the flexible transmission direction, and transmission direction types of a third time unit of a third component carrier and a fourth time unit of a fourth component carrier are semi-statically or dynamically configured as uplink transmission directions, the terminal device performs receiving in the first time unit of the first component carrier, performs neither sending nor receiving in the second time unit of the second component carrier, and does not perform sending in the third time unit of the third component carrier and the fourth time unit of the fourth component carrier.

For another example, when the transmission direction type of the first time unit of the first component carrier is semi-statically configured as the downlink transmission direction, the transmission direction type of the second time unit of the second component carrier is the flexible transmission direction, and transmission direction types of a third time unit of a third component carrier and a fourth time unit of a fourth component carrier are semi-statically or dynamically configured as uplink transmission directions, the terminal device does not perform receiving in the first time unit of the first component carrier, performs neither sending nor receiving in the second time unit of the second component carrier, and performs sending in the third time unit of the third component carrier and the fourth time unit of the fourth component carrier. For another example, when the transmission direction type of the first time unit of the first component carrier is semi-statically configured as the downlink transmission direction, the transmission direction type of the second time unit of the second component carrier is the flexible transmission direction, transmission direction types of a third time unit of a third component carrier and a fourth time unit of a fourth component carrier are semi-statically or dynamically configured as uplink transmission directions, and a first condition is satisfied, the terminal device performs receiving in the first time unit of the first component carrier, performs neither sending nor receiving in the second time unit of the second component carrier, and does not perform sending in the third time unit of the third component carrier and the fourth time unit of the fourth component carrier. The first condition is that transmission used for radio resource management (RRM) measurement has a higher priority than transmission used for scheduling. In other words, transmission used for scheduling is less important than transmission used for RRM measurement. The first condition may also be referred to as that RRM measurement affects scheduling, or that RRM measurement causes a scheduling limitation, or that RRM measurement triggers a scheduling limitation, or the first condition is applicable to a case in which RRM measurement causes a scheduling limitation. In this application, these statements may be interchanged with each other.

For another example, when the transmission direction type of the first time unit of the first component carrier is semi-statically configured as the downlink transmission direction, the transmission direction type of the second time unit of the second component carrier is the flexible transmission direction, transmission direction types of a third time unit of a third component carrier and a fourth time unit of a fourth component carrier are semi-statically or dynamically configured as uplink transmission directions, and a second condition is satisfied, the terminal device does not perform receiving in the first time unit of the first component carrier, performs neither sending nor receiving in the second time unit of the second component carrier, and performs sending in the third time unit of the third component carrier and the fourth time unit of the fourth component carrier. The second condition is that transmission used for RRM measurement is less important than transmission used for scheduling. In other words, transmission used for scheduling has a higher priority than transmission used for RRM measurement. The second condition may also be referred to as that RRM measurement does not affect scheduling, or that RRM measurement does not cause a scheduling limitation, or that RRM measurement does not trigger a scheduling limitation, or the second condition is not applicable to a case in which RRM measurement causes a scheduling limitation. In this application, these statements may be replaced with each other.

In a possible implementation, when the transmission direction type of the first time unit of the first component carrier is semi-statically configured as the uplink transmission direction, and a transmission direction of the corresponding second time unit of the at least one second component carrier includes (or only includes) an unknown transmission direction and the uplink transmission direction, sending and receiving manners of the terminal device in the first time unit of the first component carrier and the second time unit of the at least one second component carrier are determined based on the configuration manner of the first time unit of the first component carrier and the configuration manner of the second time unit of the at least one second component carrier. The determining sending and receiving manners of the terminal device in the corresponding second time unit of the at least one second component carrier is determining that the terminal device sends data in the corresponding time unit of the at least one second component carrier; and the corresponding second time unit of the at least one second component carrier and the first time unit of the first component carrier overlap. A specific example is as follows:

For example, when the transmission direction type of the first time unit of the first component carrier is semi-statically configured as the uplink transmission direction, the transmission direction type of the second time unit of the second component carrier is the flexible transmission direction, and transmission direction types of a third time unit of a third component carrier and a fourth time unit of a fourth component carrier are semi-statically or dynamically configured as uplink transmission directions, the terminal device performs sending in the first time unit of the first component carrier, performs neither sending nor receiving in the second time unit of the second component carrier, and performs sending in the third time unit of the third component carrier and the fourth time unit of the fourth component carrier.

For another example, when the transmission direction type of the first time unit of the first component carrier is semi-statically configured as the uplink transmission direction, the transmission direction type of the second time unit of the second component carrier is the flexible transmission direction, and transmission direction types of a third time unit of a third component carrier and a fourth time unit of a fourth component carrier are semi-statically or dynamically configured as downlink transmission directions, the terminal device performs sending in the first time unit of the first component carrier, performs neither sending nor receiving in the second time unit of the second component carrier, and does not perform receiving in the third time unit of the third component carrier and the fourth time unit of the fourth component carrier.

For another example, when the transmission direction type of the first time unit of the first component carrier is semi-statically configured as the uplink transmission direction, the transmission direction type of the second time unit of the second component carrier is the flexible transmission direction, and transmission direction types of a third time unit of a third component carrier and a fourth time unit of a fourth component carrier are semi-statically or dynamically configured as downlink transmission directions, the terminal device does not perform sending in the first time unit of the first component carrier, performs neither sending nor receiving in the second time unit of the second component carrier, and performs receiving in the third time unit of the third component carrier and the fourth time unit of the fourth component carrier. For another example, when the transmission direction type of the first time unit of the first component carrier is semi-statically configured as the uplink transmission direction, the transmission direction type of the second time unit of the second component carrier is the flexible transmission direction, transmission direction types of a third time unit of a third component carrier and a fourth time unit of a fourth component carrier are semi-statically or dynamically configured as downlink transmission directions, and a first condition is satisfied, the terminal device performs sending in the first time unit of the first component carrier, performs neither sending nor receiving in the second time unit of the second component carrier, and does not perform receiving in the third time unit of the third component carrier and the fourth time unit of the fourth component carrier. The first condition is that transmission used for radio resource management (RRM) measurement has a higher priority than transmission used for scheduling. In other words, transmission used for scheduling is less important than transmission used for RRM measurement.

For another example, when the transmission direction type of the first time unit of the first component carrier is semi-statically configured as the uplink transmission direction, the transmission direction type of the second time unit of the second component carrier is the flexible transmission direction, transmission direction types of a third time unit of a third component carrier and a fourth time unit of a fourth component carrier are semi-statically or dynamically configured as downlink transmission directions, and a second condition is satisfied, the terminal device does not perform sending in the first time unit of the first component carrier, performs neither sending nor receiving in the second time unit of the second component carrier, and performs receiving in the third time unit of the third component carrier and the fourth time unit of the fourth component carrier. The second condition is that transmission used for RRM measurement is less important than transmission used for scheduling. In other words, transmission used for scheduling has a higher priority than transmission used for RRM measurement.

In a possible implementation, the method further includes: determining, when the first time unit of the first component carrier of the terminal device is semi-statically configured and not all of the corresponding second time unit of the at least one second component carrier is semi-statically configured, whether the terminal device performs sending and receiving in the first time unit of the first component carrier.

In this application, not all of the corresponding second time unit of the at least one second component carrier is semi-statically configured. This indicates that: (1) some second component carriers are semi-statically configured, and the other second component carriers are dynamically configured; and (2) all the second component carriers are dynamically configured.

In the foregoing possible implementation, there are a plurality of manners of determining whether the terminal device performs sending and receiving in the first time unit of the first component carrier.

In a possible implementation, when the transmission direction type of the first time unit of the first component carrier is the uplink transmission direction, and the transmission direction type of the corresponding second time unit of the at least one second component carrier includes the downlink transmission direction, the terminal does not perform sending in the first time unit of the first component carrier.

In a possible implementation, when the transmission direction type of the first time unit of the first component carrier is the downlink transmission direction, and the transmission direction type of the corresponding second time unit of the at least one second component carrier includes the uplink transmission direction, the terminal does not perform receiving in the first time unit of the first component carrier.

When no conflict occurs in the transmission direction type of the corresponding second time unit of the at least one second component carrier, there are a plurality of manners of determining whether the terminal device performs sending or receiving in the corresponding second time unit of the at least one second component carrier.

In a possible implementation, when the first time unit of the first component carrier is semi-statically configured, and the transmission direction type of the corresponding second time unit of the at least one second component carrier includes the uplink transmission direction, if not all of the corresponding second time unit of the at least one second component carrier is semi-statically configured, the terminal device performs sending in the second time unit of the at least one second component carrier.

In a possible implementation, when the first time unit of the first component carrier is semi-statically configured, and the transmission direction type of the corresponding second time unit of the at least one second component carrier includes the downlink transmission direction, if not all of the corresponding second time unit of the at least one second component carrier is semi-statically configured, the terminal device performs receiving in the second time unit of the at least one second component carrier.

In a possible implementation, when the transmission direction type of the first time unit of the first component carrier is semi-statically configured as the downlink transmission direction, and the transmission direction type of the corresponding second time unit of the at least one second component carrier includes the uplink transmission direction, if not all of the corresponding second time unit of the at least one second component carrier is semi-statically configured, the terminal device performs sending in the corresponding second time unit of the at least one second component carrier, and the terminal device does not perform receiving in the first time unit of the first component carrier.

In a possible implementation, when the transmission direction type of the first time unit of the first component carrier is semi-statically configured as the uplink transmission direction, and the transmission direction type of the corresponding second time unit of the at least one second component carrier includes the downlink transmission direction, if not all of the corresponding second time unit of the at least one second component carrier is semi-statically configured, the terminal device performs receiving in the corresponding second time unit of the at least one second component carrier, and the terminal device does not perform sending in the first time unit of the first component carrier.

In a possible implementation, when the transmission direction type of the first time unit of the first component carrier is semi-statically configured as the downlink transmission direction, the transmission direction type of the corresponding second time unit of the at least one second component carrier includes the uplink transmission direction, and the second condition is satisfied, if not all of the corresponding second time unit of the at least one second component carrier is semi-statically configured, the terminal device performs sending in the corresponding second time unit of the at least one second component carrier, and the terminal device does not perform receiving in the first time unit of the first component carrier.

In a possible implementation, when the transmission direction type of the first time unit of the first component carrier is semi-statically configured as the uplink transmission direction, the transmission direction type of the corresponding second time unit of the at least one second component carrier includes the downlink transmission direction, and the second condition is satisfied, if not all of the corresponding second time unit of the at least one second component carrier is semi-statically configured, the terminal device performs receiving in the corresponding second time unit of the at least one second component carrier, and the terminal device does not perform sending in the first time unit of the first component carrier.

In a possible implementation, when the transmission direction type of the first time unit of the first component carrier is semi-statically configured as the downlink transmission direction, and the transmission direction type of the corresponding second time unit of the at least one second component carrier includes the uplink transmission direction, if not all of the corresponding second time unit of the at least one second component carrier is semi-statically configured, the terminal device does not perform sending in the corresponding second time unit of the at least one second component carrier, and the terminal device performs receiving in the first time unit of the first component carrier.

In a possible implementation, when the transmission direction type of the first time unit of the first component carrier is semi-statically configured as the uplink transmission direction, and the transmission direction type of the corresponding second time unit of the at least one second component carrier includes the downlink transmission direction, if not all of the corresponding second time unit of the at least one second component carrier is semi-statically configured, the terminal device does not perform receiving in the corresponding second time unit of the at least one second component carrier, and the terminal device performs sending in the first time unit of the first component carrier.

In a possible implementation, when the transmission direction type of the first time unit of the first component carrier is semi-statically configured as the downlink transmission direction, the transmission direction type of the corresponding second time unit of the at least one second component carrier includes the uplink transmission direction, and the first condition is satisfied, if not all of the corresponding second time unit of the at least one second component carrier is semi-statically configured, the terminal device does not perform sending in the corresponding second time unit of the at least one second component carrier, and the terminal device performs receiving in the first time unit of the first component carrier.

In a possible implementation, when the transmission direction type of the first time unit of the first component carrier is semi-statically configured as the uplink transmission direction, the transmission direction type of the corresponding second time unit of the at least one second component carrier includes the downlink transmission direction, and the first condition is satisfied, if not all of the corresponding second time unit of the at least one second component carrier is semi-statically configured, the terminal device does not perform receiving in the corresponding second time unit of the at least one second component carrier, and the terminal device performs sending in the first time unit of the first component carrier.

This application is applicable to all cases of overlapping, timing alignment, timing nonalignment, or the like between the first time unit of the first component carrier and the second time unit of the at least one second component carrier.

In a possible implementation, the semi-static configuration includes at least one of cell-common slot format configuration, cell-specific slot format configuration, terminal-dedicated slot format configuration, measurement configuration, or semi-statically configured scheduling information. Most typically, the semi-static configuration is the measurement configuration. For example, the semi-static configuration is measurement configuration related to a synchronization signal. For another example, the semi-static configuration is measurement configuration (including downlink CSI-RS measurement configuration or uplink SRS measurement configuration) related to channel measurement. Most typically, the dynamic configuration is scheduling with DCI, for example, any one of DCI 0_0, DCI 0_1, DCI 1_0, DCI 1_1, DCI 2_3, or any new DCI format.

Figure 9:
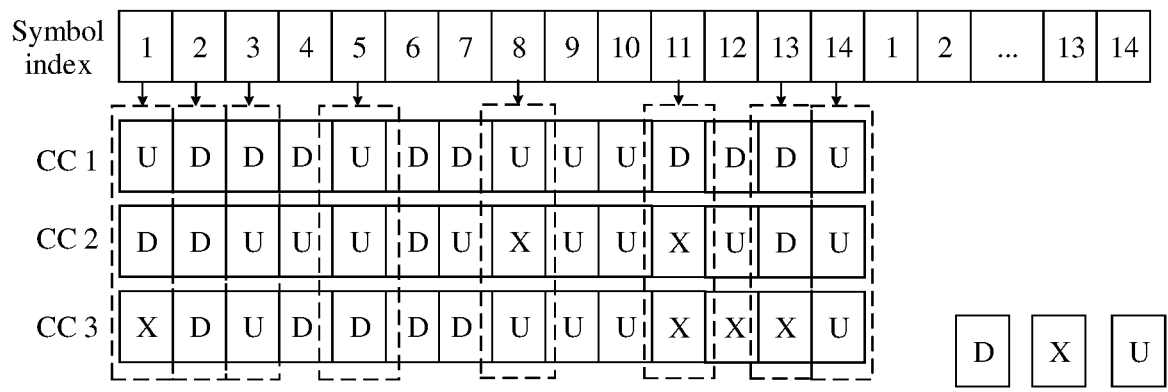
FIG. 9 is a schematic diagram of a communication resource according to still another embodiment of this application.

FIG. 9 is a schematic diagram of a communication resource according to another embodiment of this application. In this embodiment, component carriers CC 1, CC 2, and CC 3 are carriers aggregated by a terminal UE. For ease of description, in this embodiment of this application, the component carrier CC 1 is used as the first component carrier mentioned above, and the CC 2 and the CC 3 are used as the second component carriers mentioned above. The terminal device cannot perform full-duplex communication.

In FIG. 9, transmission direction types of some symbols of the component carriers are selected as an example for description. As shown in the figure, none of a symbol 1 to a symbol 14 of the CC 1 are flexible symbols X, but the symbol 1 to the symbol 14 of the CC 1 are uplink symbols or downlink symbols. In this example, the CC 1 is used as the first component carrier, and each symbol of the CC 1 is semi-statically configured.

Case 1

Referring to the symbol 5, as shown in the figure, a transmission direction of a symbol 5 of the CC 2 is an uplink transmission direction, and a transmission direction of a symbol 5 of the CC 3 is a downlink transmission direction. In this case, the terminal device performs neither receiving nor sending on the symbol 5 of the CC 2, and also performs neither receiving nor sending on the symbol 5 of the CC 3.

In other words, when a transmission direction type of a corresponding second time unit of at least one second component carrier includes both the uplink transmission direction and the downlink transmission direction, that is, in the at least one second component carrier, transmission direction types of corresponding second time units of some second component carriers are uplink transmission directions, and transmission direction types of corresponding second time units of some second component carriers are downlink transmission directions, the terminal device performs neither sending nor receiving in the corresponding second time unit of the at least one second component carrier.

Case 2

Referring to the symbol 11, as shown in the figure, transmission direction types of a symbol 11 of the CC 2 and a symbol 11 of the CC 3 are both flexible or variable transmission directions. In this case, the terminal device performs neither receiving nor sending on the symbol 11 of the CC 2, and also performs neither receiving nor sending on the symbol 11 of the CC 3.

In other words, when a transmission direction type of a corresponding second time unit of at least one second component carrier is the flexible or variable transmission direction, the terminal device performs neither sending nor receiving in the corresponding second time unit of the at least one second component carrier.

Case 3

Referring to the symbol 1, as shown in the figure, when the symbol 1 of the CC 1 is semi-statically configured, not both a symbol 1 of the CC 2 and a symbol 1 of the CC 3 are semi-statically configured, a transmission direction type of the symbol 1 of the CC 1 is an uplink transmission direction, and a transmission direction of the symbol 1 of the CC 2 is a downlink transmission direction, the terminal device does not perform sending on the symbol 1 of the CC 1.

Referring to the symbol 12, as shown in the figure, when the symbol 12 of the CC 1 is semi-statically configured, not both a symbol 12 of the CC 2 and a symbol 12 of the CC 3 are semi-statically configured, a transmission direction type of the symbol 12 of the CC 1 is the downlink transmission direction, and a transmission direction of the symbol 12 of the CC 2 is the uplink transmission direction, the terminal device does not perform receiving on the symbol 12 of the CC 1.

Herein, that not both the symbol 1 of the CC 2 and the symbol 1 of the CC 3 are semi-statically configured may include the following forms:

The symbol 1 of one of the CC 2 and the CC 3 is semi-statically configured, and the symbol 1 of the other one of the CC 2 and the CC 3 is dynamically configured; or both the symbol 1 of the CC 2 and the symbol 1 of the CC 3 are dynamically configured.

In other words, when the first time unit of the first component carrier is semi-statically configured, and not all of the corresponding second time unit of the at least one second component carrier is semi-statically configured, if the transmission direction type of the first time unit of the first component carrier is the uplink transmission direction (or the downlink transmission direction), and the transmission direction type of the corresponding second time unit of the at least one second component carrier includes the downlink transmission direction (or the uplink transmission direction), the terminal device does not perform sending (or receiving) in the first time unit of the first component carrier.

It should be noted that, that the transmission direction type of the corresponding second time unit of the at least one second component carrier includes the uplink (downlink) transmission direction may include the following forms:

The transmission direction type of the corresponding second time unit of the at least one second component carrier is the uplink transmission direction (or the downlink transmission direction); or the transmission direction type of the at least one second member in the corresponding second time unit includes the flexible or variable transmission direction and the uplink transmission direction (or the downlink transmission direction).

It should be understood that whether the terminal device performs sending or receiving is related to a transmission direction type of a time unit of a carrier. To avoid repeated descriptions, only an example in which the transmission direction type of the first time unit of the first component carrier is the uplink transmission direction is used above for description, and a case in which the transmission direction type of the first time unit of the first component carrier is the downlink transmission direction is similar to the case in which the transmission direction type of the first time unit of the first component carrier is the uplink transmission direction, and therefore, is marked in parentheses for representation.

Case 4

Referring to the symbol 2, as shown in the figure, when transmission directions of a symbol 2 of the CC 2 and a symbol 2 of the CC 3 are both downlink transmission directions, to be specific, a corresponding second time unit of at least one second component carrier has a same transmission direction type/no conflict occurs in a transmission direction type of a corresponding second time unit of at least one second component carrier, and the symbol 2 of the CC 1 is semi-statically configured, if not both the symbol 2 of the CC 2 and the symbol 2 of the CC 3 are semi-statically configured, the terminal device performs sending on the symbol 2 of the CC 2 and/or the symbol 2 of the CC 3.

Referring to the symbol 13, as shown in the figure, a transmission direction of a symbol 13 of the CC 2 is the downlink transmission direction, a transmission direction of a symbol 13 of the CC 3 is a flexible or variable transmission direction, and the symbol 13 of the CC 1 is semi-statically configured, if not both the symbol 13 of the CC 2 and the symbol 13 of the CC 3 are semi-statically configured, the terminal device performs receiving on the symbol 13 of the CC 2 and/or the symbol 13 of the CC 3.

In other words, when no conflict occurs in the transmission direction type of the corresponding second time unit of the at least one second component carrier, the first time unit of the first component carrier is semi-statically configured, and the transmission direction type of the corresponding second time unit of the at least one second component carrier includes the downlink transmission direction, if not all of the corresponding second time unit of the at least one second component carrier is semi-statically configured, the terminal device performs receiving in the second time unit of the at least one second component carrier.

Referring to the symbol 14, as shown in the figure, when transmission directions of a symbol 14 of the CC 2 and a symbol 14 of the CC 3 are both uplink transmission directions, to be specific, a corresponding second time unit of at least one second component carrier has a same transmission direction type/no conflict occurs in a transmission direction type of a corresponding second time unit of at least one second component carrier, and the symbol 14 of the CC 1 is semi-statically configured, if not both the symbol 14 of the CC 2 and the symbol 14 of the CC 3 are semi-statically configured, the terminal device performs sending on the symbol 14 of the CC 2 and/or the symbol 14 of the CC 3.

Referring to the symbol 8, as shown in the figure, a transmission direction of a symbol 8 of the CC 2 is a flexible or variable transmission direction, a transmission direction of a symbol 8 of the CC 3 is the uplink transmission direction, and the symbol 8 of the CC 1 is semi-statically configured, if not both the symbol 8 of the CC 2 and the symbol 8 of the CC 3 are semi-statically configured, the terminal device performs sending on the symbol 8 of the CC 2 and/or the symbol 8 of the CC 3.

In other words, when no conflict occurs in the transmission direction type of the corresponding second time unit of the at least one second component carrier, the first time unit of the first component carrier is semi-statically configured, and the transmission direction type of the corresponding second time unit of the at least one second component carrier includes the uplink transmission direction, if not all of the corresponding second time unit of the at least one second component carrier is semi-statically configured, the terminal device performs sending in the second time unit of the at least one second component carrier.

It should be noted that, that no conflict occurs in the transmission direction type of the corresponding second time unit of the at least one second component carrier means that the corresponding second time unit of the at least one second component carrier has the same transmission direction type (where the transmission direction type is the uplink transmission direction or the downlink transmission direction); or the transmission direction type of the corresponding second time unit of the at least one second component carrier includes the uplink transmission direction and the flexible or variable transmission direction; or the transmission direction type of the corresponding second time unit of the at least one second component carrier includes the downlink transmission direction and the flexible or variable transmission direction.

Case 5

Referring to the symbol 3, as shown in the figure, a transmission direction type of the symbol 3 of the CC 1 is a downlink transmission direction, transmission direction types of a symbol 3 of the CC 2 and a symbol 3 of the CC 3 do not conflict and both are uplink transmission directions, the symbol 3 of the CC 1 is semi-statically configured, and not both the symbol 3 of the CC 2 and the symbol 3 of the CC 3 are semi-statically configured. In this case, the terminal performs sending on the symbol 3 of the CC 2 and/or the symbol 3 of the CC 3, and does not perform receiving on the symbol 3 of the CC 1.

Referring to the symbol 1, as shown in the figure, a transmission direction type of the symbol 1 of the CC 1 is an uplink transmission direction, transmission direction types of a symbol 1 of the CC 2 and a symbol 1 of the CC 3 do not conflict (where a transmission direction of the symbol 1 of the CC 2 is the downlink transmission direction, and the transmission direction type of the symbol 1 of the CC 3 is a flexible or variable transmission direction), the symbol 1 of the CC 1 is semi-statically configured, and not both the symbol 1 of the CC 2 and the symbol 1 of the CC 1 are semi-statically configured. In this case, the terminal performs receiving on the symbol 1 of the CC 2 and/or the symbol 1 of the CC 3, and does not perform sending on the symbol 1 of the CC 1.

Case 6

Referring to the symbol 3, as shown in the figure, a transmission direction type of the symbol 3 of the CC 1 is a downlink transmission direction, transmission direction types of a symbol 3 of the CC 2 and a symbol 3 of the CC 3 do not conflict and both are uplink transmission directions, the symbol 3 of the CC 1 is semi-statically configured, and not both the symbol 3 of the CC 2 and the symbol 3 of the CC 3 are semi-statically configured. In this case, the terminal does not perform sending on the symbol 3 of the CC 2 and the symbol 3 of the CC 3, and performs receiving on the symbol 3 of the CC 1.

Referring to the symbol 1, as shown in the figure, a transmission direction type of the symbol 1 of the CC 1 is the uplink transmission direction, transmission direction types of a symbol 1 of the CC 2 and a symbol 1 of the CC 3 do not conflict (where a transmission direction of the symbol 1 of the CC 2 is the downlink transmission direction, and the transmission direction type of the symbol 1 of the CC 3 is a flexible or variable transmission direction), the symbol 1 of the CC 1 is semi-statically configured, and not both the symbol 1 of the CC 2 and the symbol 1 of the CC 3 are semi-statically configured. In this case, the terminal does not perform receiving on the symbol 1 of the CC 2 and the symbol 1 of the CC 3, and performs sending on the symbol 1 of the CC 1.

The foregoing describes in detail the method embodiments in the embodiments of this application with reference to FIG. 1 to FIG. 9. The following describes in detail apparatus embodiments in the embodiments of this application with reference to FIG. 10 to FIG. 12. It should be understood that the descriptions of the method embodiments correspond to descriptions of the apparatus embodiments. Therefore, for parts that are not described in detail, refer to the foregoing method embodiments.

Figure 10:
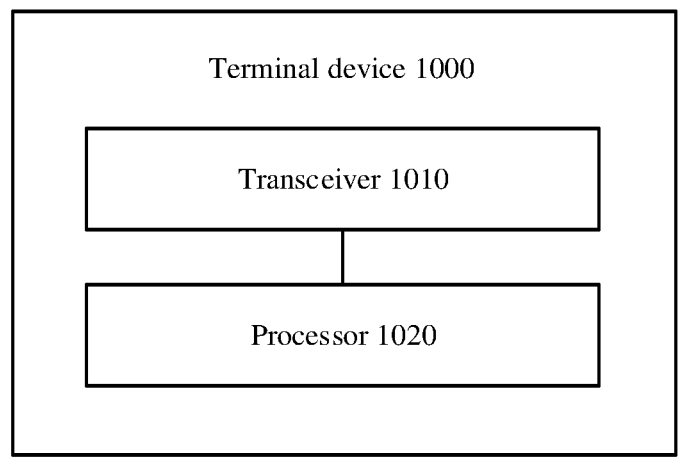
FIG. 10 is a schematic structural diagram of a terminal device according to an embodiment of this application.

FIG. 10 is a schematic structural diagram of a terminal device 1000 according to an embodiment of this application. The terminal device 1000 in FIG. 10 may be a specific example of the terminal device 120 in FIG. 1. The terminal device shown in FIG. 10 may be configured to perform the method in FIG. 3, and may specifically implement the embodiments shown in FIG. 4 to FIG. 7. To avoid redundancy, details are not described again.

The terminal device 1000 shown in FIG. 10 includes a transceiver 1010 and a processor 1020.

The transceiver 1010 is configured to receive information indicating a transmission direction type of a first time unit of a first component carrier and information indicating a transmission direction type of a corresponding second time unit of at least one second component carrier.

The processor 1020 is configured to: when the transmission direction type of the first time unit of the first component carrier is a flexible or variable transmission direction, determine, based on target information, sending and receiving manners of the transceiver 1010 in the corresponding second time unit of the at least one second component carrier, where the target information includes at least one of the following information: a configuration manner of the first time unit of the first component carrier, a configuration manner of the corresponding second time unit of the at least one second component carrier, and the transmission direction type of the corresponding second time unit of the at least one second component carrier.

Optionally, the corresponding second time unit of the at least one second component carrier and the first time unit of the first component carrier overlap.

Optionally, the time unit is at least one of a subframe, a slot, a mini-slot, or a symbol.

Optionally, the processor is specifically configured to: when the transmission direction type of the corresponding second time unit of the at least one second component carrier includes an uplink transmission direction and a downlink transmission direction, indicate the transceiver 1010 to skip performing sending and receiving in the corresponding second time unit of the at least one second component carrier.

Optionally, the processor is specifically configured to: when the transmission direction type of the corresponding second time unit of the at least one second component carrier is the flexible or variable transmission direction, indicate the transceiver 1010 to skip performing sending and receiving in the corresponding second time unit of the at least one second component carrier.

Optionally, the processor is specifically configured to: when no conflict occurs in the transmission direction type of the corresponding second time unit of the at least one second component carrier, indicate the transceiver 1010 to perform sending or receiving in the corresponding second time unit of the at least one second component carrier.

Optionally, the processor is specifically configured to: when the first time unit of the first component carrier is semi-statically configured, and the transmission direction type of the corresponding second time unit of the at least one second component carrier includes an uplink transmission direction, if the corresponding second time unit of the at least one second component carrier is semi-statically configured and/or dynamically configured, indicate the transceiver 1010 to perform sending in the corresponding second time unit of the at least one second component carrier; or when the first time unit of the first component carrier is semi-statically configured, and the transmission direction type of the corresponding second time unit of the at least one second component carrier includes a downlink transmission direction, if the corresponding second time unit of the at least one second component carrier is semi-statically configured and/or dynamically configured, indicate the transceiver 1010 to perform receiving in the corresponding second time unit of the at least one second component carrier.

Optionally, the processor is specifically configured to: when the first time unit of the first component carrier is dynamically configured, and the transmission direction type of the first time unit of the first component carrier is an uplink transmission direction, if the corresponding second time unit of the at least one second component carrier is semi-statically configured and/or dynamically configured, indicate the transceiver 1010 to perform sending in the corresponding second time unit of the at least one second component carrier; or when the first time unit of the first component carrier is dynamically configured, and the transmission direction type of the first time unit of the first component carrier is a downlink transmission direction, if the corresponding second time unit of the at least one second component carrier is semi-statically configured and/or dynamically configured, indicate the transceiver 1010 to perform receiving in the corresponding second time unit of the at least one second component carrier.

Optionally, the semi-static configuration includes at least one of cell-common slot format configuration, cell-specific slot format configuration, terminal-dedicated slot format configuration, measurement configuration, or semi-statically configured scheduling information; and the dynamic configuration includes at least one of slot format indicator SFI configuration or downlink control information DCI configuration.

Optionally, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

Optionally, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

Figure 11:
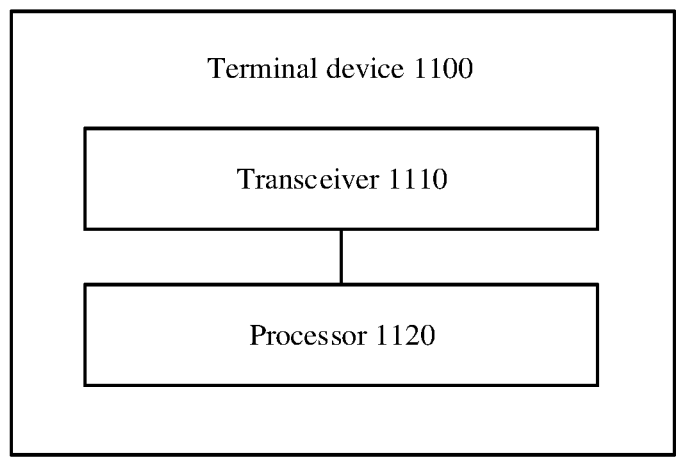
FIG. 11 is a schematic structural diagram of a terminal device according to another embodiment of this application.

FIG. 11 is a schematic structural diagram of a terminal device 1100 according to another embodiment of this application. The terminal device 1100 in FIG. 11 may be a specific example of the terminal device 120 in FIG. 1. The terminal device shown in FIG. 11 may be configured to perform the method in FIG. 8, and may specifically implement the embodiment shown in FIG. 9. To avoid redundancy, details are not described again.

The terminal device 1100 shown in FIG. 1i includes a transceiver 1110 and a processor 1120.

The transceiver 1110 is configured to receive information indicating a transmission direction type of a first time unit of a first component carrier and information indicating a transmission direction type of a corresponding second time unit of at least one second component carrier.

The processor 1120 is configured to: when the first time unit of the first component carrier is semi-statically configured, determine, based on target information, sending and receiving manners of the transceiver 1110 in the corresponding second time unit of the at least one second component carrier, where the target information includes at least one of the following information: the transmission direction type of the first time unit of the first component carrier, the transmission direction type of the corresponding second time unit of the at least one second component carrier, and a configuration manner of the corresponding second time unit of the at least one second component carrier.

Optionally, the corresponding second time unit of the at least one second component carrier and the first time unit of the first component carrier overlap.

Optionally, the time unit is at least one of a subframe, a slot, a mini-slot, or a symbol.

Optionally, the processor is specifically configured to: when the transmission direction type of the corresponding second time unit of the at least one second component carrier includes an uplink transmission direction and a downlink transmission direction, indicate the transceiver 1110 to skip performing sending and receiving in the corresponding second time unit of the at least one second component carrier.

Optionally, the processor is specifically configured to: when the transmission direction type of the corresponding second time unit of the at least one second component carrier is a flexible or variable transmission direction, indicate the transceiver 1110 to skip performing sending and receiving in the corresponding second time unit of the at least one second component carrier.

Optionally, the processor is specifically configured to: when no conflict occurs in the transmission direction type of the corresponding second time unit of the at least one second component carrier, indicate the transceiver 1110 to perform sending or receiving in the corresponding second time unit of the at least one second component carrier; or when the transmission direction type of the corresponding second time unit of the at least one second component carrier includes an uplink transmission direction and a downlink transmission direction, indicate the transceiver 1110 to skip performing sending and receiving in the corresponding second time unit of the at least one second component carrier.

Optionally, the processor is further configured to: when the first time unit of the first component carrier of the terminal device is semi-statically configured and not all of the corresponding second time unit of the at least one second component carrier is semi-statically configured, determine whether the transceiver 1110 performs sending and receiving in the first time unit of the first component carrier.

Optionally, the processor is specifically configured to: when the transmission direction type of the first time unit of the first component carrier is the uplink transmission direction, and the transmission direction type of the corresponding second time unit of the at least one second component carrier includes the downlink transmission direction, indicate the transceiver 1110 to skip performing sending in the first time unit of the first component carrier; or when the transmission direction type of the first time unit of the first component carrier is the downlink transmission direction, and the transmission direction type of the corresponding second time unit of the at least one second component carrier includes the uplink transmission direction, indicate the transceiver 1110 to skip performing receiving in the first time unit of the first component carrier.

Optionally, the processor is specifically configured to: when the first time unit of the first component carrier is semi-statically configured, and the transmission direction type of the corresponding second time unit of the at least one second component carrier includes an uplink transmission direction, if not all of the corresponding second time unit of the at least one second component carrier is semi-statically configured, indicate the transceiver 1110 to perform sending in the corresponding second time unit of the at least one second component carrier; or when the first time unit of the first component carrier is semi-statically configured, and the transmission direction type of the corresponding second time unit of the at least one second component carrier includes a downlink transmission direction, if not all of the corresponding second time unit of the at least one second component carrier is semi-statically configured, indicate the transceiver 1110 to perform receiving in the corresponding second time unit of the at least one second component carrier.

Optionally, the processor is specifically configured to: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, indicate the transceiver 1110 to perform sending in the corresponding second time unit of the at least one second component carrier, and indicate the transceiver 1110 to skip performing receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, indicate the transceiver 1110 to perform receiving in the corresponding second time unit of the at least one second component carrier, and indicate the transceiver 1110 to skip performing sending in the first time unit of the first component carrier.

Optionally, the processor is specifically configured to: when the first time unit of the first component carrier is semi-statically configured, the transmission direction type of the first time unit of the first component carrier is the downlink transmission direction, and the transmission direction type of the corresponding second time unit of the at least one second component carrier includes the uplink transmission direction, if not all of the corresponding second time unit of the at least one second component carrier is semi-statically configured, indicate the transceiver 1110 to skip performing sending in the corresponding second time unit of the at least one second component carrier, and indicate the transceiver 1110 to perform receiving in the first time unit of the first component carrier; or when the first time unit of the first component carrier is semi-statically configured, the transmission direction type of the first time unit of the first component carrier is the uplink transmission direction, and the transmission direction type of the corresponding second time unit of the at least one second component carrier includes the downlink transmission direction, if not all of the corresponding second time unit of the at least one second component carrier is semi-statically configured, indicate the transceiver 1110 to skip performing receiving in the corresponding second time unit of the at least one second component carrier, and indicate the transceiver 1110 to perform sending in the first time unit of the first component carrier.

Optionally, the semi-static configuration includes at least one of cell-common slot format configuration, cell-specific slot format configuration, terminal-dedicated slot format configuration, measurement configuration, or semi-statically configured scheduling information.

Optionally, the first component carrier is a primary component carrier, a primary component carrier in a secondary component carrier, or a component carrier having a smallest cell index in a set of component carriers aggregated by the terminal device; or a cell index of the first component carrier is smaller than a cell index of each of the at least one second component carrier.

Optionally, the sending and receiving manners include sending data and receiving data; the sending data includes sending one or more of a physical uplink shared channel PUSCH, a physical uplink control channel PUCCH, a sounding reference signal SRS, or a physical random access channel PRACH; and the receiving data includes receiving one or more of a physical downlink shared channel PDSCH, a physical downlink control channel PDCCH, or a physical hybrid ARQ indicator channel PHICH.

An embodiment of this application may further include a communications system. The communications system includes a terminal device and a base station. The terminal device may be, for example, the terminal device 120 in FIG. 1, the terminal device 1000 in FIG. 10, and the terminal device 1100 in FIG. 11. The base station may be the base station 110 in FIG. 1. The base station in the communications system may implement the foregoing operation related to the base station, and the terminal device in the system may implement the operation related to the terminal device in all the foregoing embodiments.

Figure 12:
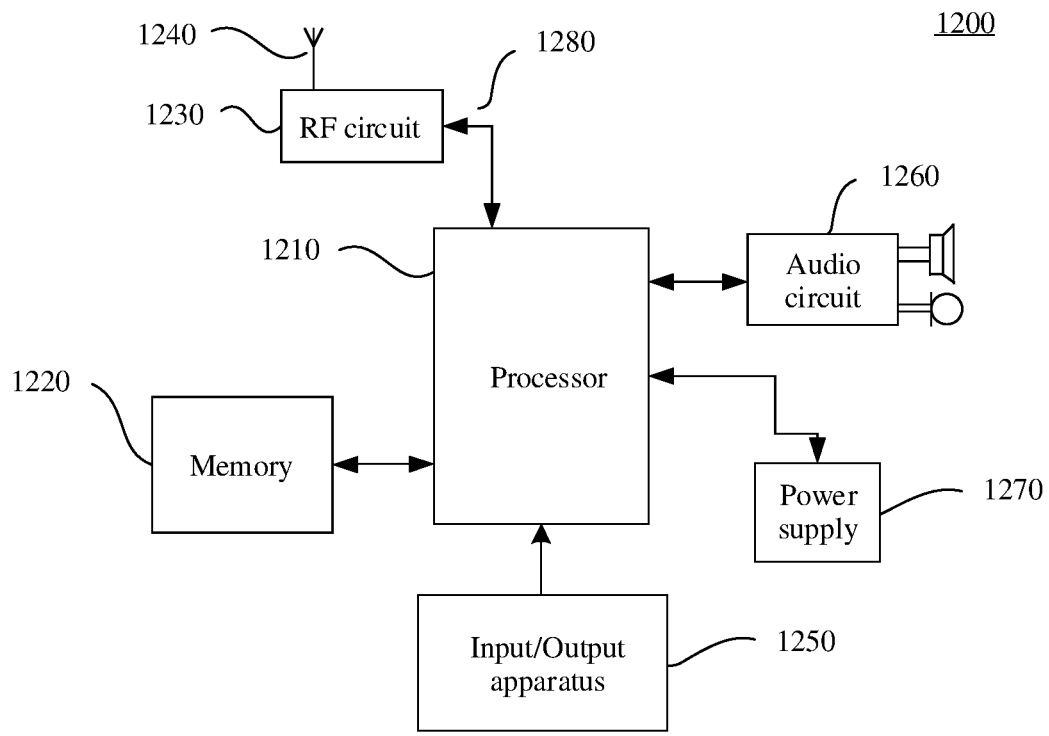
FIG. 12 is a schematic block diagram of a terminal device according to still another embodiment of this application.

FIG. 12 is a structural block diagram of a terminal device according to an embodiment of this application. The terminal device 1200 in FIG. 12 may be a specific example of the terminal device 120 in FIG. 1. The terminal device in FIG. 12 may be configured to perform the methods in FIG. 3 and FIG. 8, and may specifically implement the embodiments shown in FIG. 4 to FIG. 7 and FIG. 9. To avoid redundancy, details are not described again.

As shown in FIG. 12, the terminal device 1200 includes a processor 1210, a memory 1220, a radio frequency circuit 1230, an antenna 1240, an input/output apparatus 1250, an audio circuit 1260, and a power supply 1270. The processor 1210 may be configured to: process a communication protocol and communication data, and control the terminal to execute a software program, process data of the software program, and so on. The memory 1220 is mainly configured to store the software program and the data. The radio frequency circuit 1230 is mainly configured to: perform conversion between a baseband signal and a radio frequency signal, and process the radio frequency signal. The antenna 1240 is mainly configured to send and receive a radio frequency signal in a form of an electromagnetic wave. The input/output apparatus 1250, such as a touchscreen, a display, or a keyboard, is mainly configured to: receive data entered by a user and output data to the user. It should be noted that some types of terminals may have no input/output apparatus. The audio circuit 1260 may provide an audio interface between the user and the terminal device 1200. The power supply 1270 may supply power to each component, and may be, for example, a battery. Optionally, the power supply may be logically connected to the processor 1210 through a power management system, to implement functions such as charging, discharging, and power consumption management through the power management system.

When data needs to be sent, the processor 1210 performs baseband processing on the to-be-sent data, and outputs a baseband signal to the radio frequency circuit 1230. After performing radio frequency processing on the baseband signal, the radio frequency circuit 1230 sends a radio frequency signal in a form of an electromagnetic wave through the antenna 1240. When data is sent to the terminal, the radio frequency circuit 1230 receives a radio frequency signal through the antenna 1240, converts the radio frequency signal into a baseband signal, and outputs the baseband signal to the processor 1210. The processor converts the baseband signal into data, and processes the data. For ease of description, FIG. 12 shows only one memory 1220 and one processor 1210. In an actual terminal product, there may be one or more processors and one or more memories. The memory 1220 may also be referred to as a storage medium, a storage device, or the like. The memory 1220 may be disposed independent of the processor, or may be integrated with the processor. This is not limited in this embodiment of this application.

In this embodiment of this application, the antenna 1240 that has sending and receiving functions and the radio frequency circuit 1230 may be considered as a transceiver 1280 of the terminal, and the processor that has a processing function may be considered as a processing unit of the terminal. The transceiver 1280 may also be referred to as a transceiver unit, a transceiver machine, a transceiver apparatus, or the like, and corresponds to the transceiver 1010 or the transceiver 1110 mentioned above. The processing unit may also be referred to as a processor, a processing board, a processing module, a processing apparatus, or the like. Optionally, a component that is in the transceiver 1280 and that is configured to implement a receiving function may be considered as a receiving unit, and a component that is in the transceiver 1280 and that is configured to implement a sending function may be considered as a sending unit. In other words, the transceiver 1280 includes the receiving unit and the sending unit. The receiving unit may also be sometimes referred to as a receiver machine, a receiver, a receiver circuit, or the like. The sending unit may also be sometimes referred to as a transmitter machine, a transmitter, a transmitter circuit, or the like.

The processor 1210, the memory 1220, and the transceiver 1280 communicate with each other through an internal connection path, to transfer a control and/or data signal.

The methods disclosed in the foregoing embodiments of this application may be applied to the processor 1210, or may be implemented by the processor 1210. The processor 1210 may be an integrated circuit chip and has a signal processing capability. In an implementation process, each step of the foregoing method may be completed by using an integrated logical circuit of hardware in the processor 1210 or an instruction in a form of software.

The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general purpose processor may be a microprocessor, or the processor may be any conventional processor, or the like. Steps of the methods disclosed with reference to the embodiments of this application may be directly performed and accomplished by using a hardware decoding processor, or may be performed and accomplished by using a combination of hardware and a software module in the decoding processor. The software module may be located in a mature storage medium in the art, such as a random access memory (RAM), a flash memory, a read-only memory (ROM), a programmable read-only memory, an electrically erasable programmable memory, or a register. The storage medium is located in a memory, and the processor reads an instruction in the memory and completes the steps in the foregoing methods in combination with hardware of the processor.

Optionally, in some embodiments, the memory 1220 may store an instruction used to perform the method performed by the terminal device in the methods shown in FIG. 3 to FIG. 9. The processor 1210 may execute the instruction stored in the memory 1220, to complete, in combination with other hardware (for example, the transceiver 1280), the steps performed by the terminal in the methods shown in FIG. 3 to FIG. 9. For a specific working process and beneficial effects, refer to the descriptions in the embodiments shown in FIG. 3 to FIG. 9. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless network communication method, comprising:
   receiving, by a terminal device, information indicating a transmission direction type of a first time unit of a first component carrier and information indicating a transmission direction type of a corresponding second time unit of at least one second component carrier; and
   when the transmission direction type of the corresponding second time unit of the at least one second component carrier comprises an uplink transmission direction, and when the corresponding second time unit of the at least one second component carrier is dynamically configured, performing, by the terminal device, sending in the corresponding second time unit of the at least one second component carrier;
   wherein the corresponding second time unit of the at least one second component carrier and the first time unit of the first component carrier overlap in time, and a transmission direction of the corresponding second time unit of the at least one second component carrier is inconsistent with a transmission direction of the first time unit of the first component carrier; and
   wherein the first component carrier is a component carrier having a smallest cell index in a set of component carriers aggregated by the terminal device.

2. The method according to claim 1, wherein the information indicating the transmission direction type of the first time unit of the first component carrier, and the information indicating the transmission direction type of the corresponding second time unit of the at least one second component carrier respectively comprises at least one of explicit indication information or implicit indication information, wherein the explicit indication information comprises a semi-static slot format configuration or a dedicated slot format configuration, and the implicit indication information comprises at least one of dynamic scheduling information, measurement configuration information, or semi-static scheduling information, wherein the dynamic scheduling information comprises a downlink control information (DCI) for uplink scheduling or a DCI for downlink scheduling, wherein the DCI for uplink scheduling implicitly indicates that a transmission direction type of a corresponding time unit is the uplink transmission direction, and the DCI for downlink scheduling implicitly indicates that a transmission direction type of a corresponding time unit is a downlink direction.

3. The method according to claim 1, further comprising:
   when the transmission direction type of the first time unit of the first component carrier of the terminal device is configured according to a cell-common slot format or a terminal-dedicated slot format, and when no conflict occurs between the transmission direction type of the corresponding second time unit of the at least one second component carrier and the transmission direction type of the first time unit of the first component carrier, performing, by the terminal device, sending or receiving in the corresponding second time unit of the at least one second component carrier.

4. The method according to claim 3, wherein when the transmission direction type of the first time unit of the first component carrier of the terminal device is configured according to the cell-common slot format or the terminal-dedicated slot format, and when no conflict occurs between the transmission direction type of the corresponding second time unit of the at least one second component carrier and the transmission direction type of the first time unit of the first component carrier, performing, by the terminal device, sending or receiving in the corresponding second time unit of the at least one second component carrier comprises:
   when the transmission direction type of the first time unit of the first component carrier is a downlink transmission direction, and the transmission direction type of the corresponding second time unit of the at least one second component carrier comprises the uplink transmission direction, and when the corresponding second time unit of the at least one second component carrier is dynamically configured, performing, by the terminal device, sending in the corresponding second time unit of the at least one second component carrier, and skipping, by the terminal device, performing receiving in the first time unit of the first component carrier.

5. The method according to claim 1, wherein when the transmission direction type of the first time unit of the first component carrier is a downlink transmission direction, and the transmission direction type of the corresponding second time unit of the at least one second component carrier comprises the uplink transmission direction, skipping, by the terminal device, performing receiving in the first time unit of the first component carrier.

6. The method according to claim 1, wherein a configuration manner of the corresponding second time unit of the at least one second component carrier comprises at least one of downlink control information (DCI) or slot indicator (SFI).

7. A terminal device, comprising:
   a transceiver, configured to receive information indicating a transmission direction type of a first time unit of a first component carrier and information indicating a transmission direction type of a corresponding second time unit of at least one second component carrier; and
   a processor, configured to: when the transmission direction type of the corresponding second time unit of the at least one second component carrier comprises an uplink transmission direction, and when the corresponding second time unit of the at least one second component carrier is dynamically configured, indicate to the transceiver to perform sending in the corresponding second time unit of the at least one second component carrier;
   wherein the corresponding second time unit of the at least one second component carrier and the first time unit of the first component carrier overlap, and a transmission direction of the corresponding second time unit of the at least one second component carrier is inconsistent with a transmission direction of the first time unit of the first component carrier; and
   wherein the first component carrier is a component carrier having a smallest cell index in a set of component carriers aggregated by the terminal device.

8. The terminal device according to claim 7, wherein the information indicating the transmission direction type of the first time unit of the first component carrier and the information indicating the transmission direction type of the corresponding second time unit of the at least one second component carrier respectively comprise at least one of explicit indication information or implicit indication information, wherein the explicit indication information comprises a semi-static slot format configuration or a dedicated slot format configuration, and the implicit indication information comprises at least one of dynamic scheduling information, measurement configuration information, or semi-static scheduling information, wherein the dynamic scheduling information comprises a downlink control information (DCI) for uplink scheduling or a DCI for downlink scheduling, wherein the DCI for uplink scheduling implicitly indicates that a transmission direction type of corresponding time unit is the uplink transmission direction, and the DCI for downlink scheduling implicitly indicates that a transmission direction type of a corresponding time unit is a downlink direction.

9. The terminal device according to claim 7, wherein the processor is configured to: when the transmission direction type of the first time unit of the first component carrier of the terminal device is configured according to a cell-common slot format or a terminal-dedicated slot format and when no conflict occurs between the transmission direction type of the corresponding second time unit of the at least one second component carrier and the transmission direction type of the first time unit of the first component carrier, indicate to the transceiver to perform sending or receiving in the corresponding second time unit of the at least one second component carrier.

10. The terminal device according to claim 9, wherein the processor is further configured to:
when the transmission direction type of the first time unit of the first component carrier is a downlink transmission direction, and the transmission direction type of the corresponding second time unit of the at least one second component carrier comprises the uplink transmission direction, and when the corresponding second time unit of the at least one second component carrier is dynamically configured, indicate to the transceiver to perform sending in the corresponding second time unit of the at least one second component carrier, and to skip performing receiving in the first time unit of the first component carrier.

11. The terminal device according to claim 7, wherein the processor is configured to:
when the transmission direction type of the first time unit of the first component carrier is a downlink transmission direction, and the transmission direction type of the corresponding second time unit of the at least one second component carrier comprises the uplink transmission direction, indicate to the transceiver to skip performing receiving in the first time unit of the first component carrier.

12. The terminal device according to claim 7, wherein a configuration manner of the corresponding second time unit of the at least one second component carrier comprises at least one of downlink control information (DCI) or a slot indicator (SFI).

13. A non-transitory computer-readable storage medium, comprising executable instructions, wherein the executable instructions, when executed by a computer, cause the computer to:
receive information indicating a transmission direction type of a first time unit of a first component carrier and information indicating a transmission direction type of a corresponding second time unit of at least one second component carrier; and
when the transmission direction type of the corresponding second time unit of the at least one second component carrier comprises an uplink transmission direction, and when the corresponding second time unit of the at least one second component carrier is dynamically configured, performing sending in the corresponding second time unit of the at least one second component carrier;
wherein the corresponding second time unit of the at least one second component carrier and the first time unit of the first component carrier overlap, and the transmission direction of the corresponding second time unit of the at least one second component carrier is inconsistent with the transmission direction of the first time unit of the first component carrier; and
wherein the first component carrier is a component carrier having a smallest cell index in a set of component carriers aggregated by a terminal device.

14. The non-transitory computer-readable storage medium according to claim 13, wherein the information indicating the transmission direction type of the first time unit of the first component carrier and the information indicating the transmission direction type of the second time unit of the at least one second component carrier respectively comprise at least one of explicit indication information or implicit indication information, wherein the explicit indication information comprises a semi-static slot format configuration or a dedicated slot format configuration, and the implicit indication information comprises at least one of dynamic scheduling information, measurement configuration information, or semi-static scheduling information, wherein the dynamic scheduling information comprises a downlink control information (DCI) for uplink scheduling or a DCI for downlink scheduling, wherein the DCI for uplink scheduling implicitly indicates a transmission direction type of a corresponding time unit is the uplink transmission direction, and the DCI for downlink scheduling implicitly indicates that a transmission direction type of a corresponding time unit is a downlink direction.

15. The non-transitory computer-readable storage medium according to claim 13, wherein the executable instructions, when executed by a computer, cause the computer to:
when the transmission direction type of the first time unit of the first component carrier of the terminal device is configured according to a cell-common slot format or a terminal-dedicated slot format, and when no conflict occurs between the transmission direction type of the corresponding second time unit of the at least one second component carrier and the transmission direction type of the first component carrier, perform sending or receiving in the corresponding second time unit of the at least one second component carrier.

16. The non-transitory computer-readable storage medium according to claim 15, wherein the executable instructions, when executed by a computer, cause the computer to:
when the transmission direction type of the first time unit of the first component carrier is a downlink transmission direction, and the transmission direction type of the corresponding second time unit of the at least one second component carrier comprises an uplink transmission direction, and when the corresponding second time unit of the at least one second component carrier is dynamically configured, perform sending in the corresponding second time unit of the at least one second component carrier, and skip performing receiving in the first time unit of the first component carrier.

17. The non-transitory computer-readable storage medium according to claim 13, wherein the executable instructions, when executed by a computer, cause the computer to:
when the transmission direction type of the first time unit of the first component carrier is a downlink transmission direction, and the transmission direction type of the corresponding second time unit of the at least one second component carrier comprises the uplink transmission direction, skip performing receiving in the first time unit of the first component carrier.

18. The non-transitory computer-readable storage medium according to claim 13, wherein a configuration manner of the corresponding second time unit of the at least one second component carrier comprises at least one of downlink control information (DCI) or a slot indicator (SFI).

* * * * *